United States Patent
Adar et al.

(10) Patent No.: US 8,005,833 B2
(45) Date of Patent: Aug. 23, 2011

(54) USER PROFILE CLASSIFICATION BY WEB USAGE ANALYSIS

(75) Inventors: Eytan Adar, Palo Alto, CA (US); Lada A. Adamic, Los Altos, CA (US); Francine R. Chen, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 1129 days.

(21) Appl. No.: 11/559,355

(22) Filed: Nov. 13, 2006

(65) Prior Publication Data

US 2007/0073681 A1    Mar. 29, 2007

Related U.S. Application Data

(62) Division of application No. 10/033,586, filed on Nov. 2, 2001, now Pat. No. 7,162,522.

(51) Int. Cl.
*G06F 7/00* (2006.01)

(52) U.S. Cl. ..................... 707/734; 705/14.66

(58) Field of Classification Search .............. None
See application file for complete search history.

(56) References Cited

U.S. PATENT DOCUMENTS

| | | | |
|---|---|---|---|
| 5,565,684 A | | 10/1996 | Gullberg et al. |
| 5,774,586 A | | 6/1998 | LeCun |
| 5,991,735 A | | 11/1999 | Gerace |
| 6,018,738 A | * | 1/2000 | Breese et al. ............... 707/749 |
| 6,029,195 A | | 2/2000 | Herz |
| 6,134,532 A | * | 10/2000 | Lazarus et al. ............. 705/14.25 |
| 6,260,038 B1 | | 7/2001 | Martin et al. |
| 6,408,288 B1 | | 6/2002 | Ariyoshi |
| 6,446,035 B1 | | 9/2002 | Grefenstette et al. |
| 6,529,891 B1 | | 3/2003 | Heckerman |
| 6,574,378 B1 | | 6/2003 | Lim |
| 6,633,852 B1 | * | 10/2003 | Heckerman et al. ............ 705/27 |
| 6,681,247 B1 | | 1/2004 | Payton |
| 6,687,696 B2 | | 2/2004 | Hofmann et al. |
| 6,742,003 B2 | | 5/2004 | Heckerman et al. |
| 6,757,691 B1 | * | 6/2004 | Welsh et al. ............... 1/1 |
| 6,757,740 B1 | | 6/2004 | Parekh et al. |
| 6,839,680 B1 | * | 1/2005 | Liu et al. ............... 705/10 |
| 7,072,795 B2 | | 7/2006 | Haft et al. |

(Continued)

OTHER PUBLICATIONS

Srivastava, J. et al., "Web Usage Mining: Discovery and Application of Usage Patterns from Web Data", SIGKDD Exploration, ACM, Volumn 1, Issue 2, pp. 12-23, Jan. 2000.*

(Continued)

*Primary Examiner* — Vei-Chung Liang
(74) *Attorney, Agent, or Firm* — Park, Vaughan, Fleming & Dowler LLP; Shun Yao

(57) ABSTRACT

Demographic information of an Internet user is predicted based on an analysis of accessed web pages. Web pages accessed by the Internet user are detected and mapped to a user path vector which is converted to a normalized weighted user path vector. A centroid vector identifies web page access patterns of users with a shared user profile attribute. The user profile attribute is assigned to the Internet user based on a comparison of the vectors. Bias values are also assigned to a set of web pages and a user profile attribute can be predicted for an Internet user based on the bias values of web pages accessed by the user. User attributes can also be predicted based on the results of an expectation maximization process. Demographic information can be predicted based on the combined results of a vector comparison, bias determination, or expectation maximization process.

12 Claims, 17 Drawing Sheets

U.S. PATENT DOCUMENTS

| | | | |
|---|---|---|---|
| 7,072,888 B1 * | 7/2006 | Perkins | 707/733 |
| 2002/0029162 A1 * | 3/2002 | Mascarenhas | 705/10 |
| 2002/0091820 A1 * | 7/2002 | Hirai | 709/224 |
| 2003/0018636 A1 | 1/2003 | Chi et al. | |

OTHER PUBLICATIONS

Mobasher, B. et al., "Improving the Effectiveness of Collaborative Filtering on Anonymous Web Usage Data", In Proceedings of the IJCAI 2001 Workshop on Intelligent Techniques for Web Personalization (ITWP01), Aug. 2001, Seattle.*

Shahabi, C., et al., "Knowledge Discovery from Users Web-Page Navigation", 7th International workshop on Research Issues in Data Engineering, pp. 20-29, Apr. 7-8, 1997.*

Glance, N., et al. "Making Recommendaer Systems Work for Organization", In Proceedings of PAAM'99 London, England, Apr. 1999.*

"The Binomial Distribution," http://www.stat.yale.edu/Courses/1997-98/binom.htm, May 18, 2001.

"Web Usage Analysis and User Profiling," http://www.acm.org/sigkdd/proceedings/webkdd99/, KDD-99 Workshop Program, San Diego, CA, Aug. 15, 1999.

"Web Usage Analysis and User Profiling," http://www.acm.org/sigkdd/proceedings/webkdd99/toconline.htm, KDD-99 Workshop Program, San Diego, CA, Aug. 15, 1999.

Bilmes, J.A., "A Gentle Tutorial of the EM Algorithm and its Application to Parameter Estimation for Gaussian Mixture and Hidden Markov Models," International Computer Science Institute, TR-97-021, Apr. 1998.

Borges, J., et al., "Data Mining of User Navigation Patterns," http://www.acm.org/sigkdd/proceedings/webkdd99/papers/paper7-borges.ps, KDD-99 Workshop Program, San Diego, CA, Aug. 15, 1999.

Büchner, A.G., et al., "Navigation Pattern Discovery from Internet Data," http://www.acm.org/sigkdd/proceedings/webkdd99/papers/paper13-buchner.ps, KDD-99 Workshop Program, San Digeo, CA, Aug. 15, 1999.

Chan, P.K., "A non-invasive learning approach to building Web user profiles," http://www.acm.org/sigkdd/proceedings/webkdd99/papers/paper22-chan.ps, KDD-99 Workshop Program, San Diego, CA, Aug. 15, 1999.

Cooley, R., et al., "WebSIFT: The Web Site Information Filter System," http://www.acm.org/sigkdd/proceedings/webkdd99/papers/paper11-cooley.ps, KDD-99 Workshop Program, San Diego, CA, Aug. 15, 1999.

Dempster, et al.., "Maximum Likelihood from Incomplete Data via the EM Algorithm," J. Royal Statist. Soc. B39, pp. 1-38, 1977 (Read before the Royal Statistical Society, Dec. 8, 1976).

Etzioni, O., "The World-Wide Web: Quagmire or gold mine?" CACM, 39(11):65-68, Nov. 1996.

Fu, Y., et al., "Clustering of Web Users Based on Access Patterns," http://www.acm.org/sigkdd/proceedings/webkdd99/papers/paper10-yfu.ps, KDD-99 Workshop Program, San Diego, CA, Aug. 15, 1999.

Getoor, L., et al., "Using Probabilistic Relational Models for Collaborative Filtering," http://www.acm.org/sigkdd/proceedings/webkdd99/papers/paper21-getoor.ps, KDD-99 Workshop Program, San Diego, CA, Aug. 15, 1999.

Gomory, S., et al., "Analysis and Visualization of Metrics for Online Merchandising," http://www.acm.org/sigkdd/proceedings/webkdd99/papers/paper8-jylee.ps, KDD-99 Workshop Program, San Diego, CA, Aug. 15, 1999.

Gordon, A.D., "Classification: $2^{nd}$ Edition," Chapman & Hall, 1999.

Green, H., "The information Gold Mine," Business Week, Jul. 30, 1999.

Hofmann, T., "Probabilistic Latent Semantic Indexing," Proc. SIGIR '99, pp. 50-57, Aug. 1999.

James, M., "Classification Algorithms," John Wiley & Sons, Inc., 1985.

Lan, B., et al., "Making Web Servers Pushier," http://www.acm.org/sigkdd/proceedings/webkdd99/papers/paper12-blan.ps, KDD-99 Workshop Program, San Diego, CA, Aug. 15, 1999.

Leon-Garcia, A., "Probability and Random Processes for Electrical Engineering," $2^{nd}$ Ed., Addison-Wesley Publishing Company, Reading, MA, pp. 53-54, 61-64, 126-136, Sep. 1993.

Martin, D. C., "Abstract for the Invited Talk: The IBM SurfAid Project: Transactive Analysis and Prediction," http://www.acm.org/sigkdd/proceedings/webkdd99/invited.htm, KDD-99 Workshop Program, San Diego, CA, Aug. 15, 1999.

Masand, B., et al., "Foreword," http://www.acm.org/sigkdd/proceedings/webkdd99/forewordonline.htm, Web Usage Analysis and User Profiling. KDD-99 Workshop Program, San Diego, CA, Aug. 15, 1999.

Meng, et al., "Maximum likelihood estimation via the ECM algorithm: A general framework," Biometrika, 80, 2, pp. 267-278, 1993.

Murray, D., et al., "Inferring Demographic Attributes of Anonymous Internet Users," http://www.acm.org/sigkdd/proceedings/webkdd99/papers/paper2-murray.ps, KDD-99 Workshop Program, San Diego, CA, Aug. 15, 1999.

Russell, S., "The EM Algorithm," Machine Learning, CS 281, Spring 1998.

Spiliopoulou, M., et al., "Improving the Effectiveness of a Web Site with Web Usage Mining," http://www.acm.org/sigkdd/proceedings/webkdd99/papers/paper18-myra.ps, KDD-99 Workshop Program, San Diego, CA, Aug. 15, 1999.

Toutanova, et al., "Text Classification in a Hierarchical Mixture Model for Small Training Sets," http://www.stanford.edu/~krist/papers/cikm2001.pdf, see entire document and Sections 2.2 and 3.2.2 in particular, Aug. 29, 2001.

Vasconcelos, et al., "A Bayesian framework for semantic content characterization," In Proc. Of IEEE Conf. On Computer Vision and Pattern Recognition, CVPR '98, pp. 566-571, Santa Barbara, Jun. 1998.

Weisstein, E. W., "Bayes' Formula," http://br.crashed.net/~akrowne/crc/math/b/b076.htm, Sep. 1996, May 26, 1999.

* cited by examiner

USER PROFILE CLASSIFICATION BY WEB USAGE ANALYSIS

This application is a divisional application of U.S. patent application Ser. No. 10/033,586, entitled "User Profile Classification By Web Usage Analysis", filed Nov. 2, 2001, now U.S. Pat No. 7,162,522 by the same inventors, claims priority therefrom and incorporates its entire disclosure herein by reference. This divisional application is filed in response to a restriction requirement in U.S. patent application Ser. No. 10/033,586 and contains re-written and/or additional claims to the restricted subject matter.

CROSS-REFERENCE TO RELATED APPLICATIONS

Cross-reference is made to U.S. patent application Ser. No. 11/559,357, entitled "User Profile Classification By Web Usage Analysis" that is concurrently file with this patent application, assigned to the same assignee as this patent application, incorporated in this patent application by reference, and claims priority to U.S. patent application Ser. No. 10/033, 586, entitled "User Profile Classification By Web Usage Analysis", filed Nov.2, 2001.

BACKGROUND OF THE INVENTION

1. Field of the Invention

The present invention relates to technology for determining user information through analysis of web pages accessed by a user.

2. Description of the Related Art

As Internet usage continues to rise, it becomes increasingly important to identify the demographic characteristics of Internet users. Such characteristics can help businesses and advertisers provide services to Internet users in particular demographic groups and to attract and retain new customers. To obtain this demographic information, web sites may request Internet users to enter personal demographic information. However, such user-entered information may be incomplete, thus preventing a business from obtaining a full demographic picture of a given Internet user. In other cases, demographic information supplied by an Internet user may be false or mistakenly incorrect.

Prior art machine learning techniques attempt to extrapolate user demographic information. Examples of such prior art techniques include the use of neural networks or Baysean approaches to data extrapolation. These techniques often require excessively large amounts of computation in order to extrapolate meaningfully accurate demographic information. Such cumbersome tradeoffs thus limit the desirability of such prior art methods.

SUMMARY OF THE INVENTION

The present invention, roughly described, provides methods and systems that can be used to extrapolate user profile information from web usage. Demographic information of a test user can be predicted based on an analysis of a pattern of web pages accessed by the test user.

One embodiment of the present invention includes the step of detecting a set of web pages accessed by a test user. The accessed web pages are mapped to a first data structure. A second data structure identifies web page access patterns of users with a shared user profile attribute. A user profile attribute is assigned to the test user based on a comparison of the data structures.

In another embodiment, bias values are assigned to a set of web pages. Web pages accessed by a test user are detected. Bias values of the detected web pages are combined to obtain a combination result. A user profile attribute is assigned to the test user based on the combination result.

In a further embodiment, a set of expectation and maximization parameters are initialized. An expectation maximization process is performed using the parameters to obtain an expectation maximization process result. User profile attributes are assigned to a batch of test users in response to the expectation maximization process result.

In another embodiment, a first expectation maximization process is used to incrementally train a classifier with a set of users, each user having at least one known profile attribute. A second expectation maximization process is performed to "fold in" test user data and obtain an expectation maximization process result. A user profile attribute is assigned to the test user in response to the expectation maximization process result.

In a further embodiment, a vector classification result, bias classification result, and probabilistic classification result are obtained. At least two of the results are combined to generate a combination result. A user profile attribute is assigned to the test user in response to the combination result.

The present invention can be implemented using hardware, software, or a combination of both hardware and software. The software used for the present invention can be stored on one or more processor readable storage devices including hard disk drives, CD-ROMs, optical disks, floppy disks, tape drives, RAM, ROM, or other suitable storage devices. In alternative embodiments, some or all of the software can be replaced by dedicated hardware including custom integrated circuits, gate arrays, FPGAs, PLDs, and special purpose computers. Hardware that can be used for the present invention includes computers, handheld devices, telephones (e.g. cellular, Internet enabled, digital, analog, hybrids, and others), and other hardware known in the art. Some of these devices include processors, memory, nonvolatile storage, input devices, and output devices.

These and other advantages of the present invention will appear more clearly from the following description in which the preferred embodiment of the invention has been set forth in conjunction with the drawings.

DETAILED DESCRIPTION

When accessing a set of web pages, Internet users that share a common profile attribute, such as a particular demographic characteristic, may choose to access similar or identical pages within the set. For example, some web pages may appeal to persons having a particular gender. However, a user having the particular gender will not necessarily access all web pages that are of interest to other users sharing the same gender. Thus, the fact that a user has accessed a particular web page can be informative, but the fact that the user has not accessed other web pages may not necessarily be as informative. In accordance with the present invention, the set of web pages accessed (or "visited") by a user comprise a web page access pattern which can be analyzed to predict profile attributes of the user.

Figure 1:
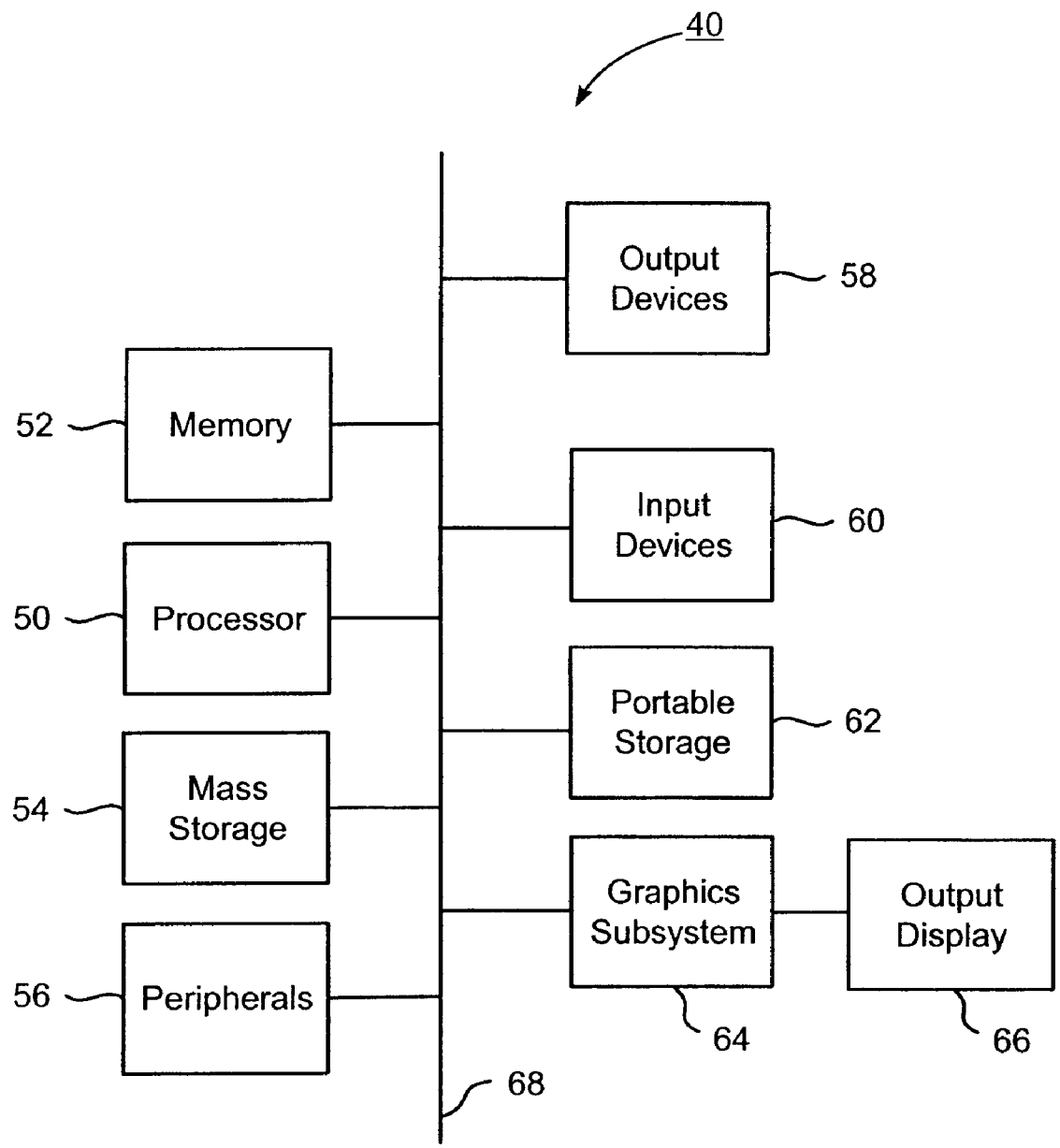
FIG. 1 is a block diagram depicting components of a computing system that can be used with the present invention.

FIG. 1 illustrates a block diagram of a computer system 40 which can be used for the components of the present invention. The computer system of FIG. 1 includes a processor unit 50 and main memory 52. Processor unit 50 may contain a single microprocessor, or may contain a plurality of microprocessors for configuring the computer system as a multi-processor system. Main memory 52 stores, in part, instructions and data for execution by processor unit 50. When the present invention is wholly or partially implemented in software, main memory 52 can store the executable code when in operation. Main memory 52 may include banks of dynamic random access memory (DRAM), high speed cache memory, as well as other types of memory known in the art.

The system of FIG. 1 further includes a mass storage device 54, peripheral devices 56, user input devices 60, portable storage medium drives 62, a graphics subsystem 64, and an output display 66. For purposes of simplicity, the components shown in FIG. 1 are depicted as being connected via a single bus 68. However, as will be apparent to those skilled in the art, the components may be connected through one or more data transport means. For example, processor unit 50 and main memory 52 may be connected via a local microprocessor bus, and the mass storage device 54, peripheral devices 56, portable storage medium drives 62, and graphics subsystem 64 may be connected via one or more input/output (I/O) buses. Mass storage device 54, which may be implemented with a magnetic disk drive, optical disk drive, as well as other drives known in the art, is a non-volatile storage device for storing data and instructions for use by processor unit 50. In one embodiment, mass storage device 54 stores software for implementing the present invention for purposes of loading to main memory 52.

Portable storage medium drive 62 operates in conjunction with a portable non-volatile storage medium, such as a floppy disk, to input and output data and code to and from the computer system of FIG. 1. In one embodiment, the system software for implementing the present invention is stored on such a portable medium, and is input to the computer system via the portable storage medium drive 62. Peripheral devices 56 may include any type of computer support device, such as an input/output (I/O) interface, to add additional functionality to the computer system. For example, peripheral devices 56 may include a network interface for connecting the computer system to a network, as well as other networking hardware such as modems, routers, and other hardware known in the art.

User input devices 60 provide a portion of a user interface. User input devices 60 may include an alpha-numeric keypad for inputting alpha-numeric and other information, or a pointing device, such as a mouse, a trackball, stylus, or cursor direction keys. In order to display textual and graphical information, the computer system of FIG. 1 includes graphics subsystem 64 and output display 66. Output display 66 may include a cathode ray tube (CRT) display, liquid crystal display (LCD) or other suitable display device. Graphics subsystem 64 receives textual and graphical information, and processes the information for output to display 66. Additionally, the system of FIG. 1 includes output devices 58. Examples of suitable output devices include speakers, printers, network interfaces, monitors, and other output devices known in the art.

The components contained in the computer system of FIG. 1 are those typically found in computer systems suitable for use with certain embodiments of the present invention, and are intended to represent a broad category of such computer components known in the art. Thus, the computer system of FIG. 1 can be a personal computer, workstation, server, minicomputer, mainframe computer, or any other computing device. Computer system 40 can also incorporate different bus configurations, networked platforms, multi-processor platforms, etc. Various operating systems can be used including Unix, Linux, Windows, Macintosh OS, Palm OS, and other suitable operating systems. It will also be appreciated that the present invention can be implemented using multiples of all or parts of computer system 40 depicted in FIG. 1

Figure 2:
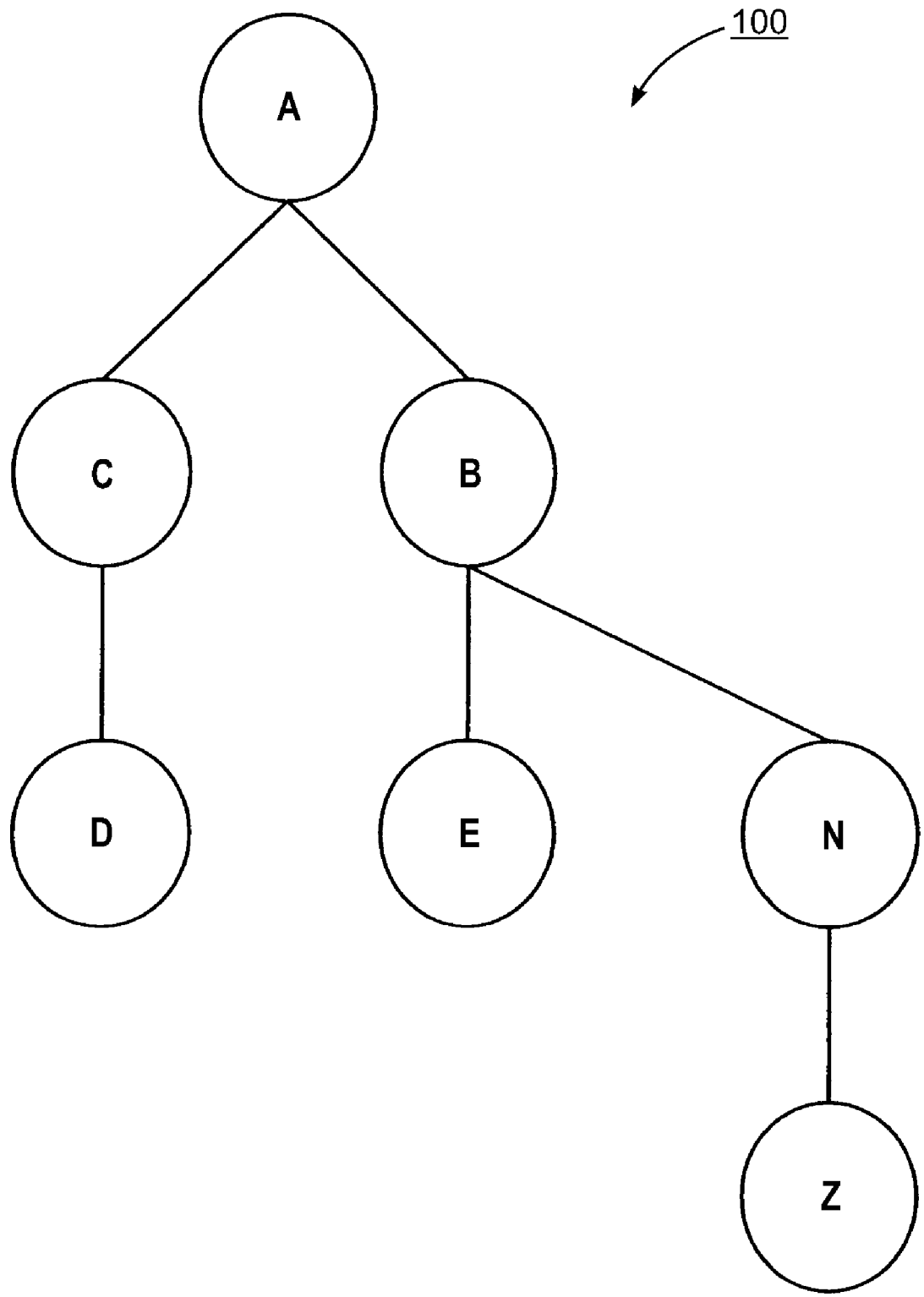
FIG. 2 is a block diagram depicting linked pages accessible by a user.

FIG. 2 provides a high level block diagram 100 depicting linked web pages of one or more web sites accessible by an Internet user. In diagram 100, separate web pages are represented by nodes A, B, C, D, E, N, and Z. The nodes of diagram 100 are linked together, allowing an Internet user to trace a path from page to page using the links found at each node. In FIG. 2, the page represented by node A allows the user to follow a link directly to node C or node B. However, direct links may not always be available. For example, if a user viewing the page represented by node A wishes to link to the page of node N, the user must first link to node B, and then perform a second link from node B to node N. By performing these separate links to nodes B and N, the user has traced a path from node A to node N.

In accordance with the present invention, a "user path" identifies a set of web pages accessed by a user. Thus, in the example above, the user path can be represented as: A, B, N. In an alternative notation, the user path can be represented as: A:B:N. Each web page in a user path can be identified by, among other things, IP addresses, sequentially numbered values, or positions in a web portal hierarchy of pages. In the case of a hierarchical directory service, a given web page can be identified by the user path traced from a high level page (such as the page represented by node A) to the given page.

A classification system ("classifier") in accordance with the present invention can detect web pages that have been accessed by a user. In one embodiment, this detection is performed by evaluating cookies stored by the user's web browser. Web pages that are referenced by the stored cookies are presumed to have been accessed by the user and are thus detected. In such an embodiment, cookies must be enabled on a user's web browser. In an alternate embodiment, web pages that are cached locally by a user's computer system are ignored by the classifier. In another embodiment, web pages are deemed to be accessed by a user when viewed by the user, regardless of where the web pages are stored such as on a web server, proxy server, cached locally by a user's computer system, or elsewhere. In yet another embodiment, detection of web pages is performed by ascertaining an IP address of a user and noting which web pages are accessed from the user's IP address.

Internet users may access a particular web page multiple times. For example, if node N contains a list of useful resources (such as a list of resources provided by a directory service) available on other web pages not illustrated in FIG. 2, an Internet user may choose to link back and forth between node N and the other web pages pointed at by node N. If the user's visits to these other pages are not detected or are ignored, each visit to node N can be recorded as a separate entry in a user path with no intervening user path entries. For example, if a user first accesses node A, links to node B, links to node N, links to an ignored page, and then links back to node N, the user path can be represented by: A, B, N, N. The individual web pages of a user path can also be represented as tuples. These tuples can comprise an identifier for an accessed page and the number of times that the page appears in the user path. Thus, a user path comprising the nodes: A, B, N, A, N can be represented by tuples: (A, 2), (B,1), and (N,2).

In accordance with the present invention, multi-dimensional vectors can be used to facilitate the determination of user profile attributes, wherein web pages are mapped to each vector dimension (or "vector index"). A user path vector is one such vector wherein the value of each vector index corresponds to the number of times the particular web page corresponding to the vector index appears in the user path of a particular user. In one embodiment, a user path vector exists in an n-dimensional space, with each dimension corresponding to a web page, wherein visits to the web page are to be detected in accordance with the present invention. For example, referring to diagram 100 of FIG. 2, if visits to the web pages at nodes A, B, C, D, E, N, and Z are to be detected, then the user path vector can be represented as: [A B C D E N Z] with a separate index for each page. In one embodiment, the value at each index of the vector is the number of times a user has accessed the web page corresponding to each particular index. Thus, applying the user path vector representation above, a user path of: A, B, N, A, N can be represented as a user path vector: [2 1 0 0 0 2 0]. A centroid vector is another multi-dimensional vector wherein the value of each vector index is determined by evaluating a set of user path vectors of Internet users having one or more known profile attributes, as further described herein. User path vectors as well as centroid vectors can be represented as data structures capable of being processed by a computer.

Figure 3:
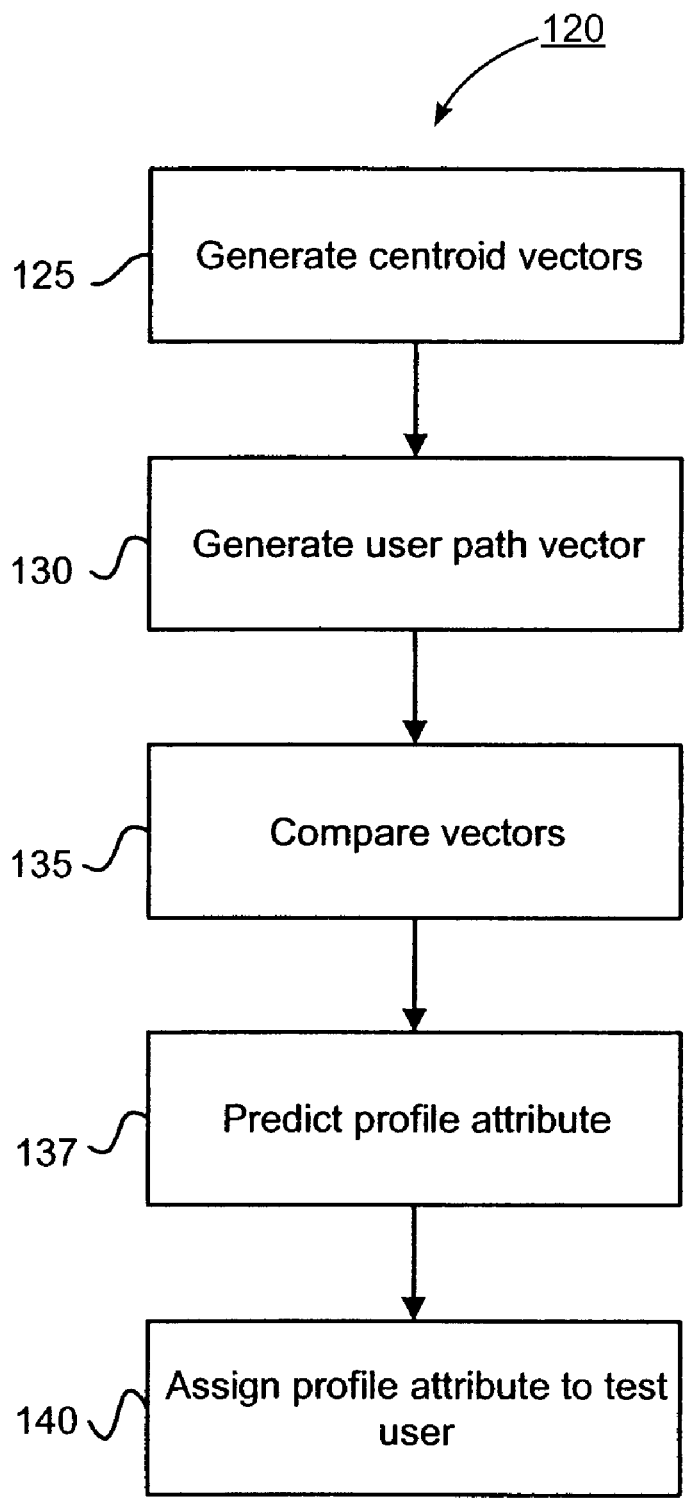
FIG. 3 is a flow chart describing a process for determining user profile attributes through a vector comparison.

FIG. 3 provides a flow chart 120 describing a process for determining a profile attribute of a user whose profile attribute is unknown or doubted ("test user"). In step 125, centroid vectors are generated for different values of user profile attributes, as further described herein. In step 130, a user path vector is generated for the test user, as further described herein. In step 135, the centroid vectors are compared with the user path vector. In step 137, a value for the test user's profile attribute is predicted based on the comparison of step 135. In step 140, the predicted profile attribute is assigned to the test user.

Figure 4:
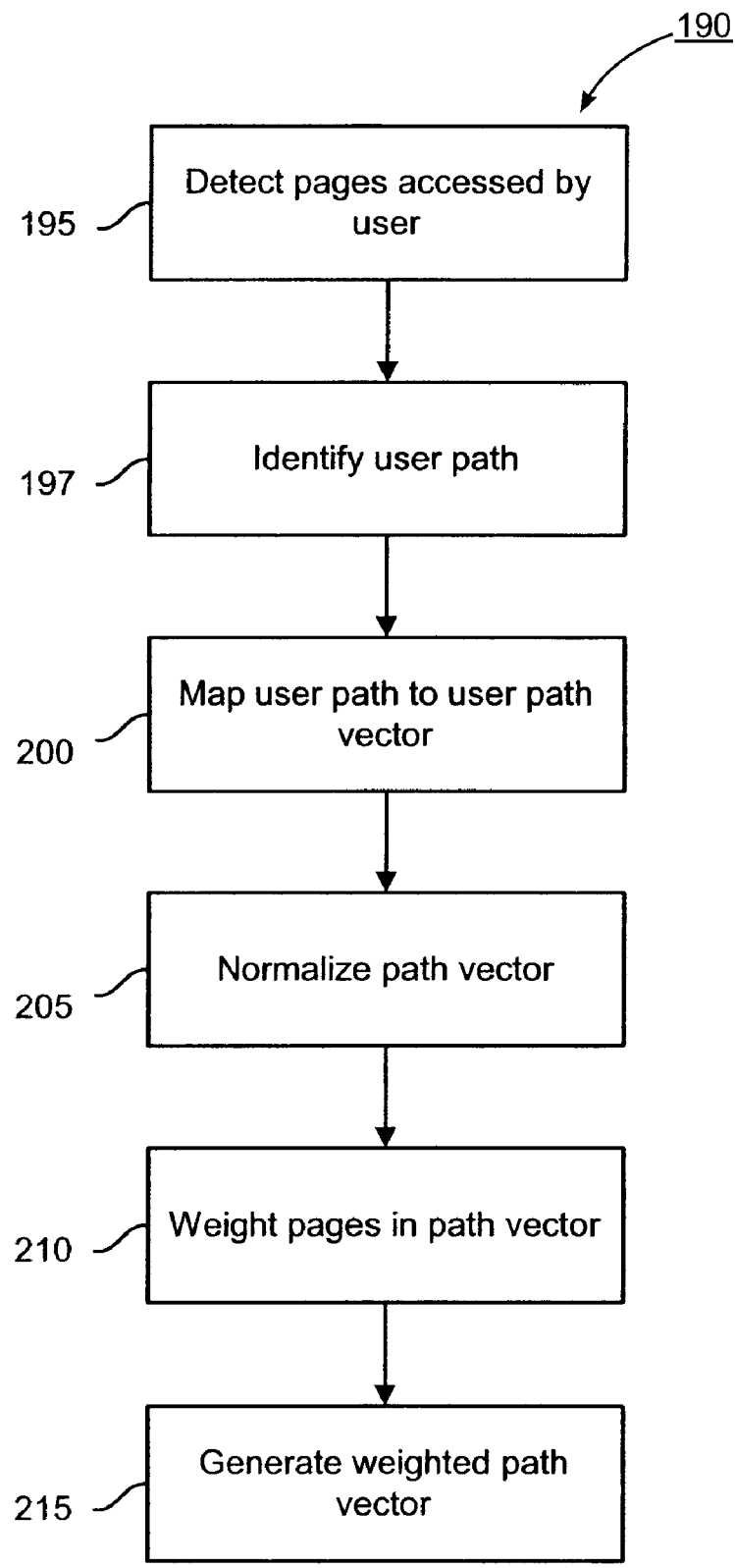
FIG. 4 is a flow chart describing a process for generating a user path vector.

FIG. 4 provides a flow chart 190 describing a process for generating a user path vector. In one embodiment, the process of FIG. 4 is called by step 130 of FIG. 3. In step 195, web pages accessed by a test user are detected. In step 197, a user path is identified based on the detected web pages, as previously described above. At step 200, the user path of the test user is mapped into a user path vector V.

To facilitate comparison of the user path vector mapped in step 200 with one or more centroid vectors as further described herein, optional steps 205, 210, and 215 can be performed. In some cases, certain Internet users may access many more web pages than other users. In order to minimize the effects of different numbers of web page visits between different test users while still considering the distribution of a test user's web page visits, the user path vector V mapped in step 200 can be normalized in step 205 to generate a normalized user path vector V'. In one embodiment, the normalized user path vector V' is generated as follows:

$$V'_k = \frac{V_k}{V_{\max}}$$

for each index k in the range 0 to size (V), where $V_{max}$ is the index having the highest value in user path vector V.

Figure 6:
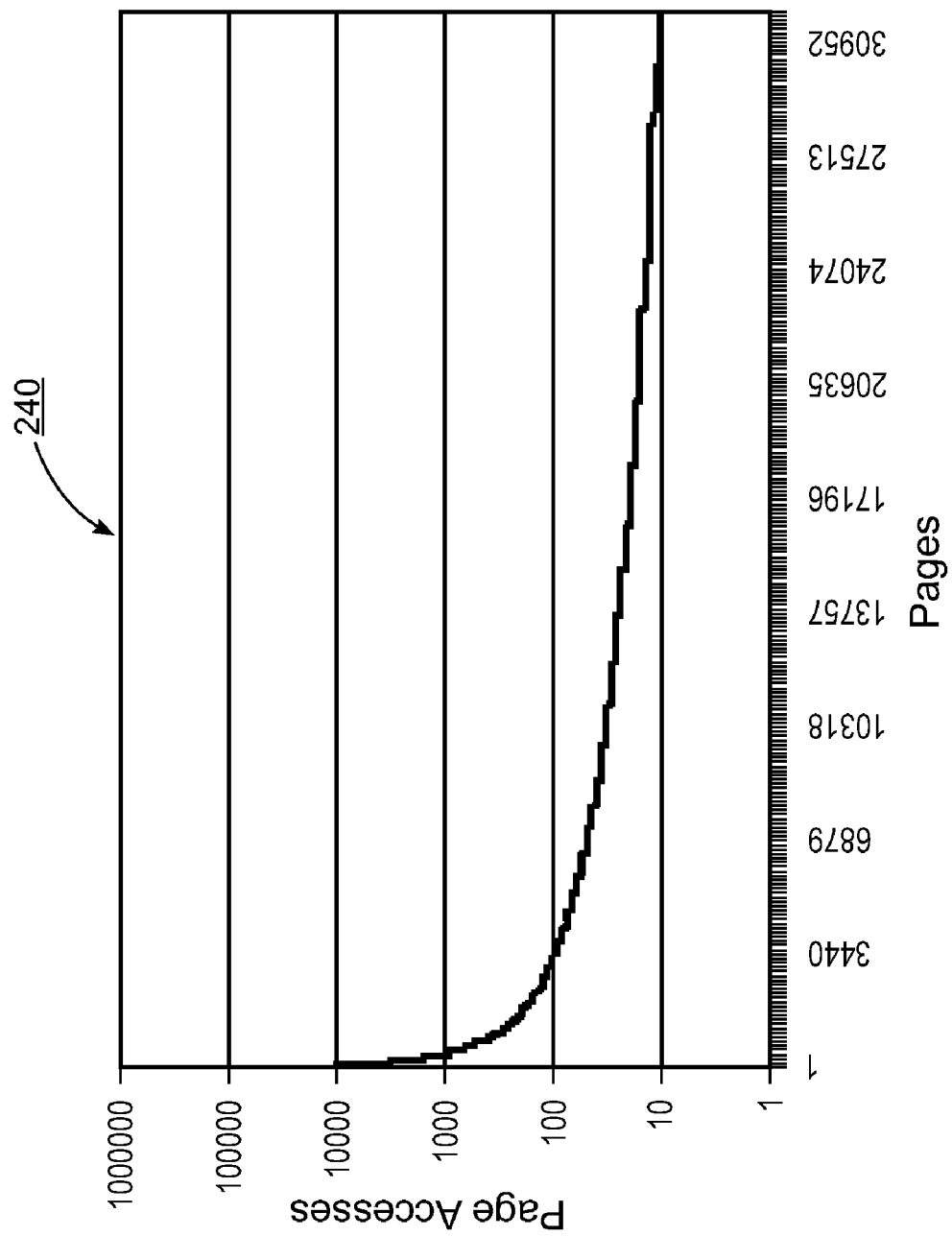
FIG. 6 is a plot illustrating numbers of user accesses per web page as measured in a sample data set.

In addition to possible differences in the relative number of web pages accessed by various Internet users, certain web pages may be accessed much more frequently than other web pages when measured over many users. This difference in frequency is illustrated in plot 240 of FIG. 6 which illustrates the number of user visits per web page as measured in a sample data set. As indicated by plot 240, certain web pages in the range of page 1 to page 3,440 are accessed much more frequently than other pages. In some cases, the disparity between web page accesses is as large as several orders of magnitude. To dampen the effects of this disparity, user path vectors can be weighted to dampen these effects.

Referring again to FIG. 4, the indices of the user path vector can be weighted in optional step 210. In one embodiment, this weighting is performed by maintaining a table T (not shown) which maps web pages to the total number of times each web page has been accessed. In one embodiment, an inverse document frequency ("IDF") weighting can be applied to the user path vector. By applying IDF, the weight of each web page k becomes:

$$\ln\left(\frac{N}{T_k}\right)$$

where N is the total number of unique users who have accessed web page k, and $T_k$ is the total number of times web page k has been accessed.

The normalization obtained in step 205 and the page weighting obtained in step 210 can be combined to generate a normalized-weighted user path vector P in step 215. In one embodiment, the indices of P are calculated as follows:

$$P_i = V_i' \ln\left(\frac{N}{T_i}\right)$$

for each i in the range 0 to size (V'). The use of P during comparison step 135 can minimize the effects of wide disparities between relative numbers of web pages accessed by different users, as well as the effects of differences in the number of times various web pages have been accessed when measured over many users, as discussed above.

Figure 5:
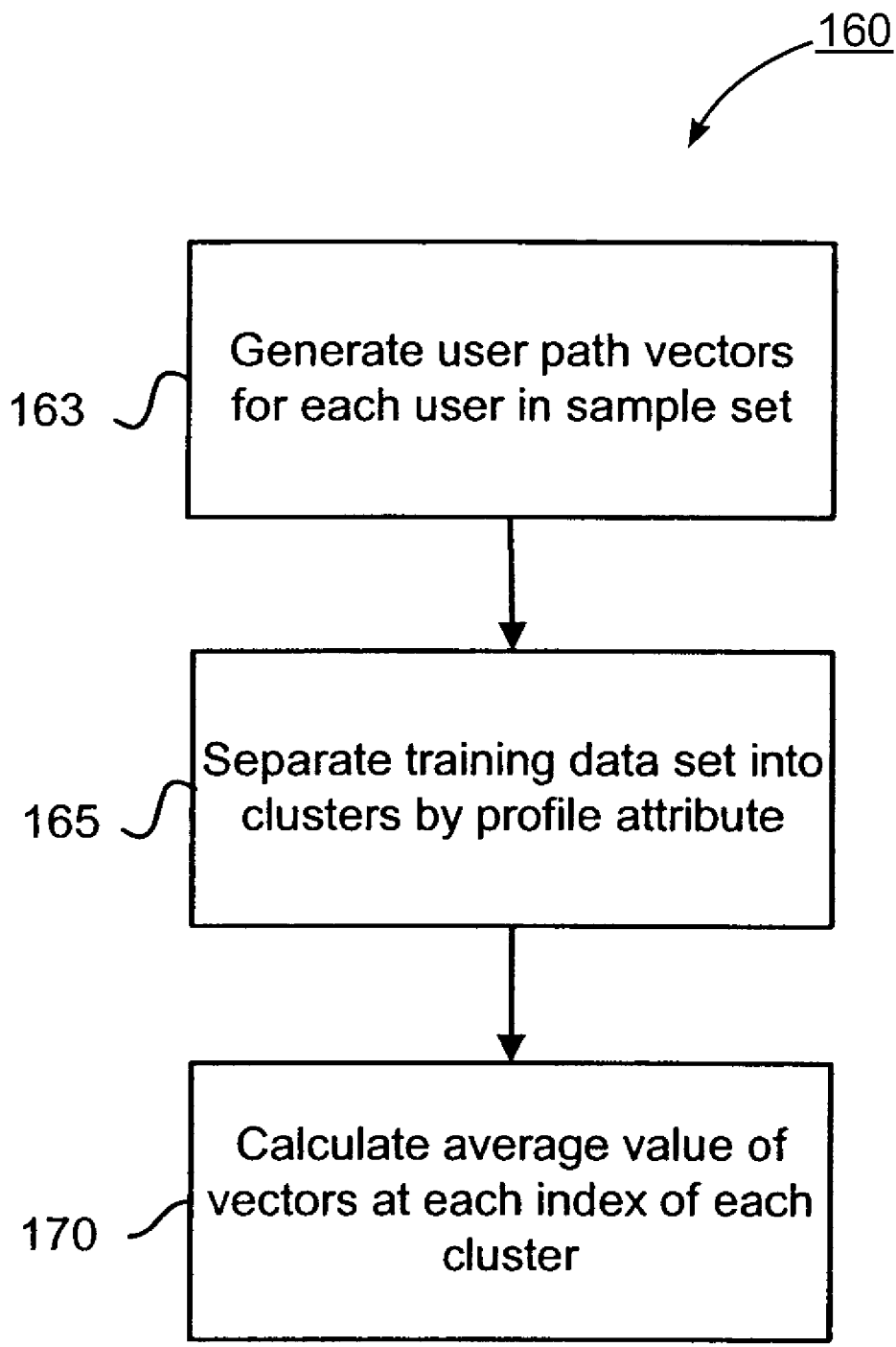
FIG. 5 is a flow chart describing a process for generating a centroid vector.

FIG. 5 provides a flow chart 160 describing a process for generating a centroid vector. In one embodiment, the process of FIG. 5 is called by step 125 of FIG. 3. In order to generate a centroid vector, a set of user path vectors are generated for users in a sample data set for whom at least one profile attribute is known in step 163. In one embodiment, step 163 calls the process of FIG. 4. If the gender of a test user is sought to be classified, then the set of user path vectors are generated from user paths of Internet users for whom a gender profile attribute is known. In step 165, the user paths of users in the sample set are separated into clusters distinguished by the value of the known attribute. Thus, if gender of a test user is to be classified, then all user paths of sample set users known to be male can be placed in one cluster, and the remaining user paths of sample set users known to be female can be placed in a second cluster. This cluster grouping facilitates the generation of separate centroid vectors for male and female users in the sample set as further described herein.

In step 170, the index values of one or more centroid vectors are calculated. For example, if gender is to be classified, separate centroid vectors can be generated for the male and female clusters of sample set users. The user path of each user in the sample set can be represented as a user path vector having indices corresponding to different web pages. The number of times that a sample set user accesses a page can be represented numerically by an index of the user path vector. In one embodiment, the indices of the centroid vector for each cluster correspond to the average values of the indices of the user path vectors generated from user paths in the corresponding cluster. For example, each index $C_i$ of a male cluster centroid vector $C^m$ can be calculated as follows:

$$C_i = \frac{\sum_k V_i^k}{M}$$

where $V_i^k$ is the value at index i for the vector representing the kth male sample set user and M is the number of male users in the sample set. The indices of female cluster centroid vector $C^f$ can be similarly calculated by substituting female values into the equation above, where $V_i^k$ is the value at index i for the vector representing the kth female sample set user and M is the number of female users in the sample set. As a result of calculating $C_i$ for each index of each cluster, separate multi-dimensional centroid vectors $C^m$ and $C^f$ are constructed.

Referring to FIG. 3, after generation steps 125 and 130, vector P can be compared to centroid vectors $C^m$ and $C^f$ in step 135. Various distance metrics can be used to evaluate the distance between P and $C^m$ as well as the distance between P and $C^f$. In one embodiment, the centroid vector having the shortest distance from vector P is predicted to correspond to a profile attribute of the test user represented by P (step 137) and assigned to the test user (step 140). In one embodiment, the distance between vector P and a centroid vector C is determined using the cosine distance:

$$\cos\theta = \frac{\sum_i P_i * C_i}{\|P\| * \|C\|}$$

Using this method, the test user is predicted to have the user attribute of the cluster for which the cosine value is the greatest. For example, if gender is the user profile attribute to be predicted, then a greater cosine value measured between P and $C^m$ than between P and $C^f$ would indicate that the test user's behavior more closely matches the behavior of an "average" male user than the behavior of an "average" female user. As a result, a male user will be predicted (step 137) and assigned to the test user (step 140).

Figure 7:
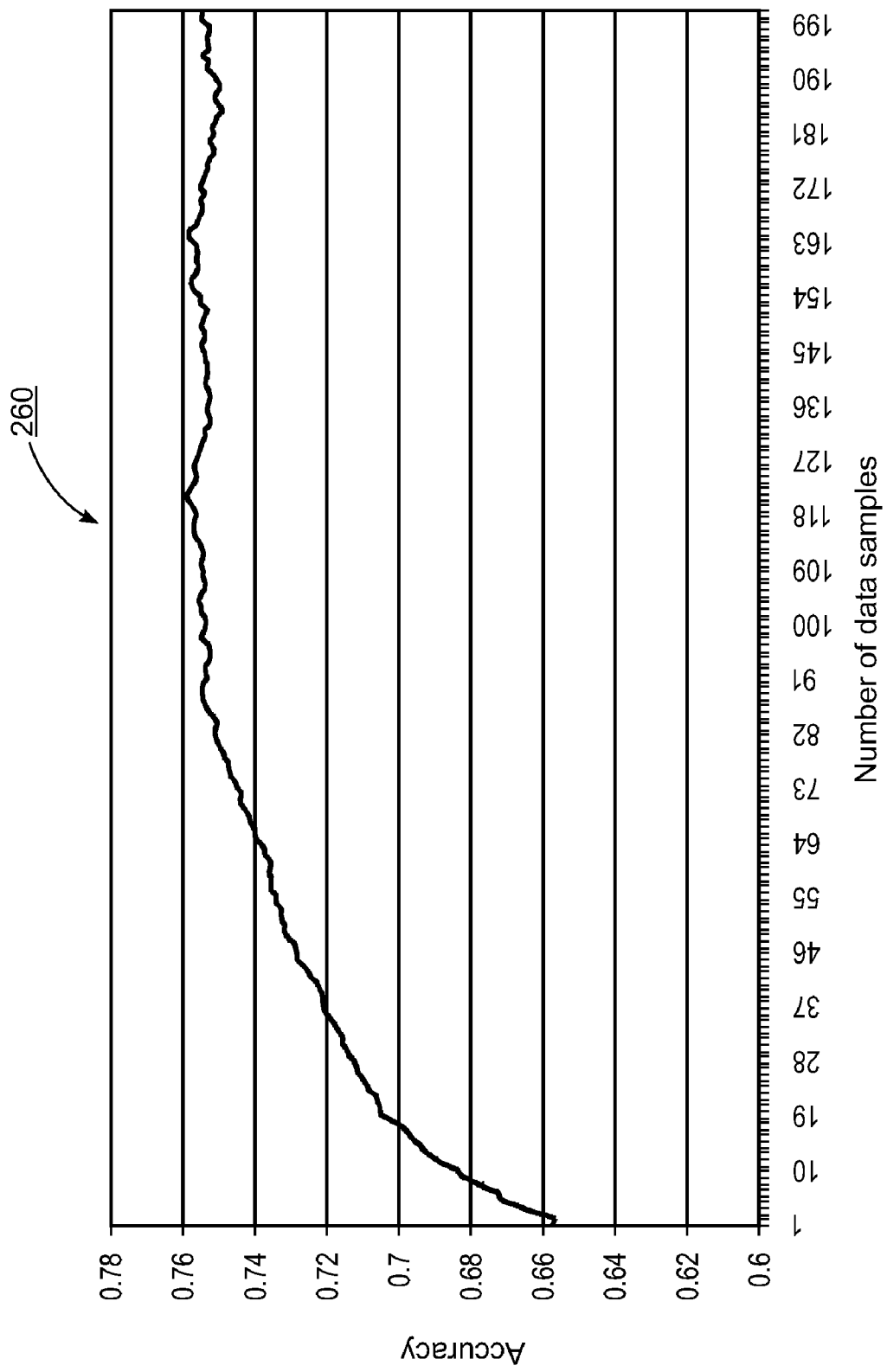
FIG. 7 is a plot illustrating accuracy rates achieved by an embodiment of the present invention using a vector comparison.

FIG. 7 provides a plot 260 depicting classification accuracy rates achieved by an embodiment of the present invention using a vector comparison. Plot 260 illustrates the percentage of times that a test user's gender was guessed correctly for different numbers of data samples. To generate plot 260, log files from a major Internet portal web site were used to generate centroid vectors for the gender of a sample set of users for whom gender was known. The y-axis of plot 260 measures the accuracy of predicting a correct gender user profile attribute (i.e. the number of correctly classified users divided by the total number of users guessed). The x-axis measures the number of web page accesses by the test user that were considered. As indicated by plot 260, accuracy increases as more web page visits are considered. This experimental data indicates that a classifier in accordance with the present invention can predict the gender of a test user with an accuracy of over 75% when a sufficient number of web sites are visited by the user.

In some cases, users having certain profile attributes may access a great many more web pages than persons having other attributes. For example, in the log files described above, users identifying themselves as females accessed web pages distributed across a greater number of web sites than users identifying themselves as males. As a result, the number of non-zero indices in the female centroid vector $C^f$ for the above data was consistently much greater than the male centroid vector $C^m$. Thus, the cosine value calculated in the distance metric above was always higher when using female centroid vector $C^f$. This caused the number of predicted females to be biased upwards. To counteract this effect, the distance between vector P and a female centroid vector $C^f$ can be artificially increased. This technique was applied in the experiment that generated plot 260. In one embodiment, each index of vector P can be reduced to implement this change in distance. In another embodiment, the cosine distance measured between vector P and female centroid vector $C^f$ can be multiplied by a reducing factor (for example, 0.8).

Other refinements can further improve the accuracy of a vector comparison classifier in accordance with the present invention. The centroid vectors $C^m$ and $C^f$ can be truncated in a number of different ways. For example, a principal component analysis, as it is understood by those skilled in the art, can be applied to reduce the dimensions of the centroid vectors.

This technique ignores indices of the vectors that are not informative, such as indices corresponding to web pages that do not bear a strong relationship to gender. For example, such a technique may cause the entry page of a web portal site to be ignored.

In the experiments described above, the test sample set used to generate the centroid vectors was artificially selected to represent an equal male/female distribution. However, real world experience may not necessarily mirror such an equal distribution. For example, if males comprise 60% of all Internet users and females comprise 40% of all Internet users, the principles of Bayes Law, as it is understood by those skilled in the art, can be applied to take into account the a priori distribution.

Web page access patterns can depend on multiple user attributes, such as the gender as well as the occupation of a given test user. Certain occupational distributions that vary by male/female user attributes can be combined with the gender determinations above to further improve the accuracy of a classifier in accordance with the present invention.

The dependence of web pages to other web pages can also be considered by a classifier in accordance with the present invention. For example, in diagram 100 of FIG. 2, a user's act of linking to node Z followed by a link to node N is not necessarily informative for purposes of determining profile attributes of the user. If node Z has only a single link to node N with no links to other pages, then the strong relationship between node Z and node N can create an artificially high number of accesses to node N. In such a case, the vector indices corresponding to node N can be reduced in value, or simply not considered, in order to offset the artificially high value. In another embodiment, such web page dependencies are ignored by the classifier.

As a further refinement, different transition probabilities for different user profile attributes can be considered. For example, if it is known that male users tend to make a particular transition from one web page to another web page while females tend to perform a different transition, this information can be instructive in the prediction of a test user's gender.

In another embodiment, alternate distance metrics can be used for calculating the distance between vector P and centroid vectors $C^m$ and $C^f$. Examples of such alternate distance metrics include counting the number of steps between the vectors using a city street distance calculation or performing a Euclidian distance calculation, as these calculations are known in the art.

The present invention can be further refined by using alternate ways of comparing vector P with centroid vectors $C^m$ and $C^f$ in step 135 other than, or in addition to, the distance metrics discussed above. FIGS. 8A-C illustrate several such alternatives. In these figures, a reduced web page space of two pages is assumed wherein a given user will access pages 1 and 2 a total of m and n times, respectively. The user path vector of the user can therefore be represented as [M N]. The vectors of users having a known gender are plotted in the two-dimensional space and marked with a point to indicate their profile attribute as male (X) or female (O). Ideally, members of the male classification would fall into a first localized area as represented in the two-dimensional space, with the female classification in a second localized area.

Figure 8:
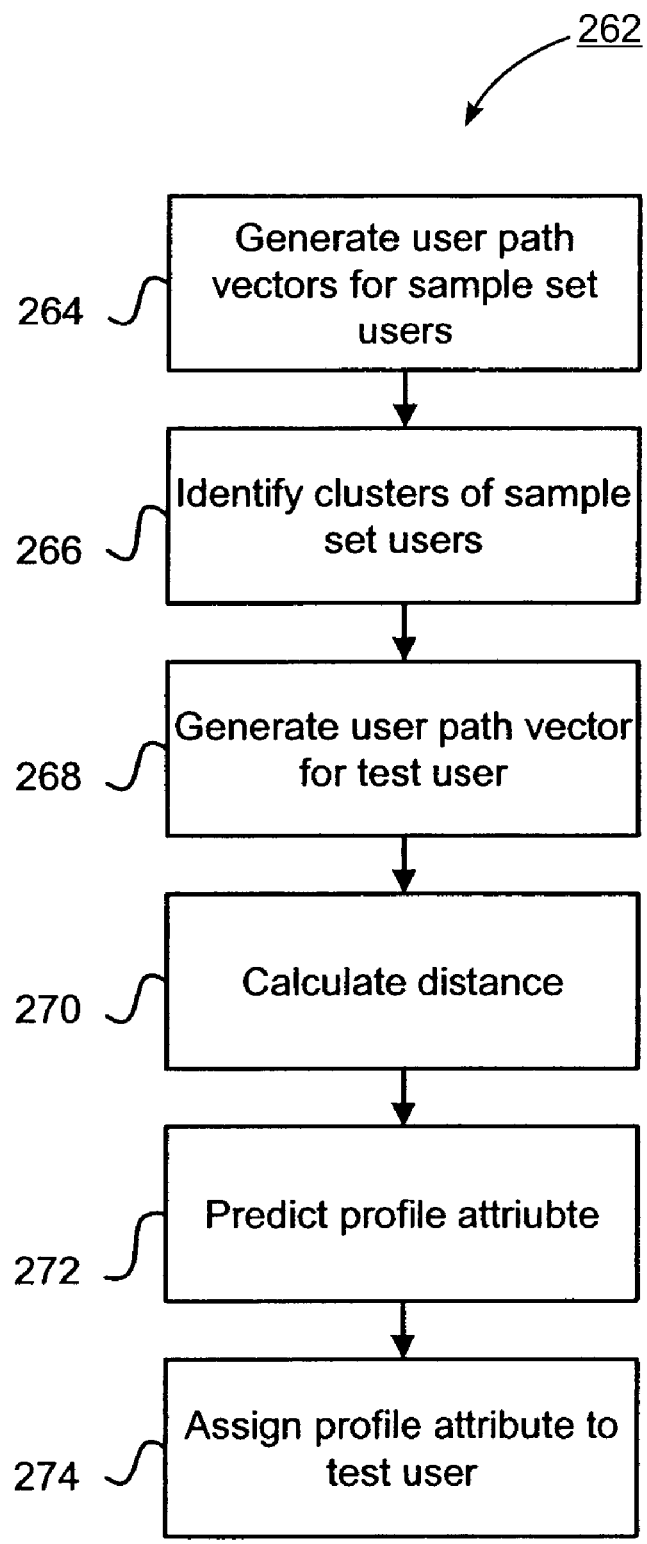
FIG. 8 is a flow chart describing a process for determining user profile attributes through alternate vector comparisons.
Figure 8A:
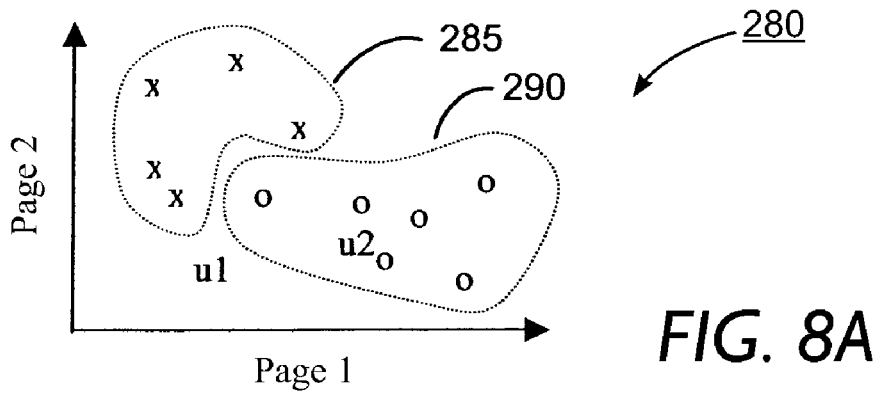
FIG. 8A illustrates a grouping of users by a convex hull drawn around training data set points having common profile attributes.
Figure 8B:
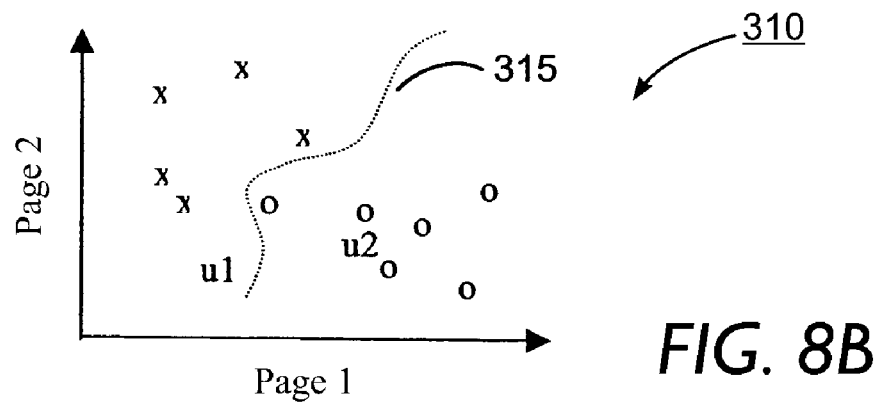
FIG. 8B illustrates a grouping of users by a line separating training data set points having different profile attributes.
Figure 8C:
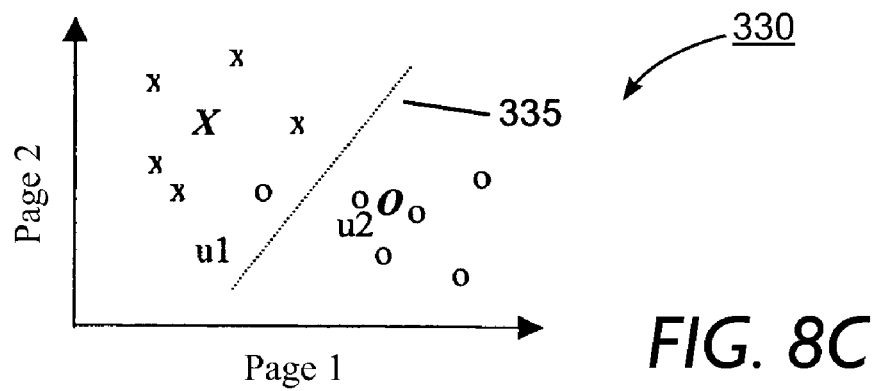
FIG. 8C illustrates a grouping of users by a straight line approximation drawn through training data set points having different profile attributes.

FIG. 8 is a flow chart 262 describing a process for determining user profile attributes through alternate vector comparisons. In step 264, user path vectors are generated for sample set users. Clusters of sample set users having profile attributes in common are then identified in step 266. In step 268, a user path vector is generated for the test user. A distance is calculated between the user path vector of the test user and each identified cluster (step 270). In step 272, a user profile attribute is predicted for the test user. In one embodiment, the profile attribute associated with the cluster having the shortest distance from the test user path vector is predicted for the test user. In step 274, the profile attribute predicted in step 272 is assigned to the test user.

FIG. 8A illustrates the use of convex hulls 285 and 290 drawn around the clusters of users with known genders. Test users u1 and u2 can be plotted in the two-dimensional space as indicated. To test whether users u1 and u2 should be classified as male or female, a distance from each of users u1 and u2 to convex hulls 285 and 290 is measured in step 135. Each of users u1 and u2 is then predicted to have the profile attribute corresponding to the closest measured cluster/hull combination.

FIG. 8B illustrates a grouping of users by a line 315 separating male clusters from female clusters. The gender of unknown users u1 and u2 can be determined by evaluating whether they reside on the male cluster side or the female cluster side of line 315.

FIG. 8C provides a plot 330 illustrating a grouping of users by a straight line approximation 335 drawn through the points representing users whose gender is known. Similar to FIG. 8B, the gender of unknown users u1 u1 and can be predicted by determining which side to line 335 unknown users u1 and u2 fall. Of the three techniques illustrated in FIGS. 8A-C, straight line approximation 335 is preferred. It can minimize the difficulties of drawing convex hulls 285 or 290 around data sets that overlap, as well as minimize the difficulties of drawing a line 315 that completely separates known male users from female users. Straight line approximation 335 further minimizes the difficulties encountered when calculating the distance between an unknown point and a dividing line.

Figure 9:
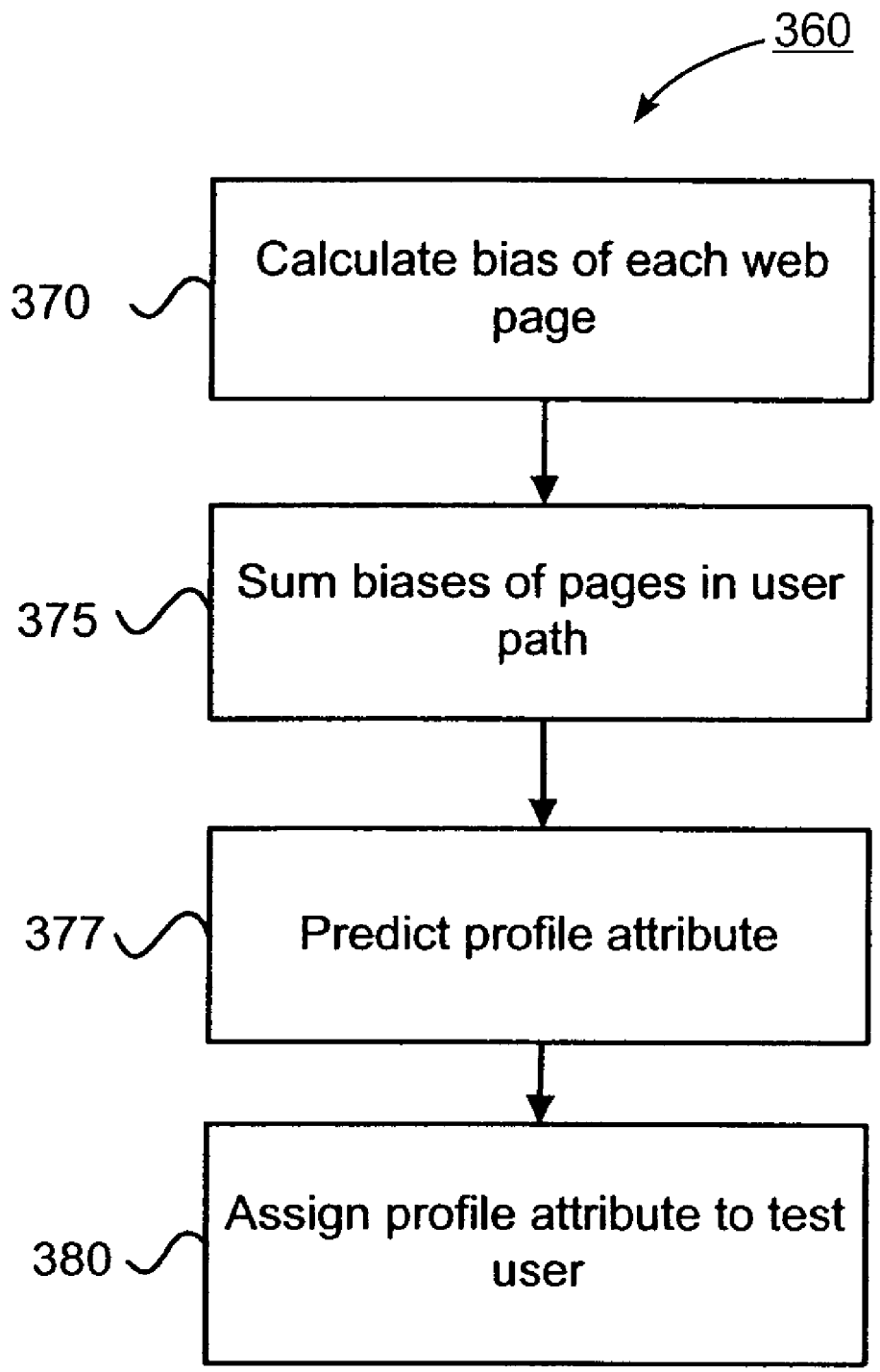
FIG. 9 is a flow chart describing a process for determining user profile attributes through an analysis of web page biases.

FIG. 9 provides a flow chart 360 describing a process for determining user profile attributes through a comparison of web page biases calculated from a sample data set. In accordance with the present invention, a user profile attribute can be determined by evaluating bias values assigned to web pages accessed by a user. The biases of all accessed pages can be summed to yield a net bias of the user. The process of FIG. 9 can be used as an alternative, or in conjunction with the process of FIG. 3.

In step 370, the bias of each web page visited by a test user is calculated. In one embodiment, the bias of a particular web page is the difference between: the actual number of users having a certain attribute who visit the page, and the product of the total number of users who visit the page and the fraction of users having the attribute as measured over a set of web pages that includes the particular web page. The bias can be further normalized by the expected deviation in the number of visitors from the expected value which depends on the number of visitors to the page. The gender bias b of a particular web page can be calculated as follows:

$$b = \frac{(M - m*N)}{\sqrt{N*m*(1-m)}}$$

where m is the fraction of all users that are male as measured over a set of web pages that includes the particular web page, M is the number of males who visit the particular web page, and N is the total number of users who have accessed the particular web page. Thus, if the overall fraction of male users as measured over all web pages of a web site users is 50%

(m=0.5), and a given web page was accessed by 10 users, 8 of which were male, the bias of the given web page would be positive, indicating a male bias:

$$b = \frac{(8 - 10*0.5)}{\sqrt{10*0.5*(1-0.5)}} = 1.90$$

On the other hand, if the web page was accessed by 10 users, 4 of which were male, then the bias of the web page would be negative, indicating a female bias:

$$b = \frac{(4 - 10*0.5)}{\sqrt{10*0.5*(1-0.5)}} = -0.63$$

In the examples above, the highest male or female bias for a web page which was accessed by 10 users is ±3.16, which would occur if all users accessing the web page were either male or female.

Applying the bias calculation to other examples, if m=0.5, a web page that is accessed by 3 male and 1 female user would have a calculated bias equal to 1.0. However, if the same site is accessed by 30 male users and 10 female users, the bias would equal 3.2. Thus, it is clear that with increased numbers of users, the calculated bias of a page can increase if relative user ratios are maintained.

Referring to FIG. 9, in step 375, the biases of all web pages visited by a test user are summed, yielding a net bias for the particular profile attribute sought to be determined. The unknown user profile attribute of the test user can be predicted (step 377) in accordance with the net bias determined in step 375 and assigned to the test user (step 380). Thus, using the bias assignments above, a male gender would be predicted in step 377 for the test user if the result of step 375 is positive. On the other hand, if the net bias is negative, then a female gender would be predicted. In experiments performed using an embodiment of the bias classifier process of FIG. 9, male users were predicted with a 58% accuracy rate while female users were predicted with a 61% accuracy rate.

The present invention further provides a classifier capable of performing a probabilistic latent variable analysis of web page access patterns to predict user profile attributes. A number of latent variables can be specified to correspond to a number of classes of a given user profile attribute (i.e. different gender or age bracket classes) sought to be predicted by the classifier.

In accordance with a probabilistic classifier of the present invention, the conditional probability of a particular user profile attribute given a particular test user: P(g|u), can be determined. Training data to be considered by a probabilistic classifier in accordance with the present invention can be represented as sets of labeled triplets: (g,s,u), where g is a user profile attribute sought to be determined by the classifier, s is a web page visited by a user, and u is a user selected from a uniform distribution. Similarly, test data can be represented as sets of labeled pairs: (s,u). Given a user u, a user profile attribute can be predicted based on the conditional probability of the gender given the user: P(g|u). Given a gender g, a particular web page s is accessed with probability: P(s|g).

Assuming that a user's gender determines whether the user accesses a web page, the probability of a particular web page being accessed by a user u with a particular gender g: P(s|gu), can be approximated as: P(s|g). Thus, the probability of observing a particular labeled pair (s,u) can be approximated as:

$$P(s, u) = P(u) \sum_g P(s|g) P(g|u)$$

where P(u) is the probability of choosing a particular user from a uniform distribution of users.

In accordance with a probabilistic classifier of the present invention, an expectation maximization ("EM") process performed by an instructable machine can be used to iteratively fit parameters calculated by the classifier by maximizing a log-likelihood result. See Dempster, et al., "Maximum likelihood from incomplete data via the EM algorithm," J. Royal Statist. Soc. B 39, 1977, incorporated by reference herein.

Figure 10:
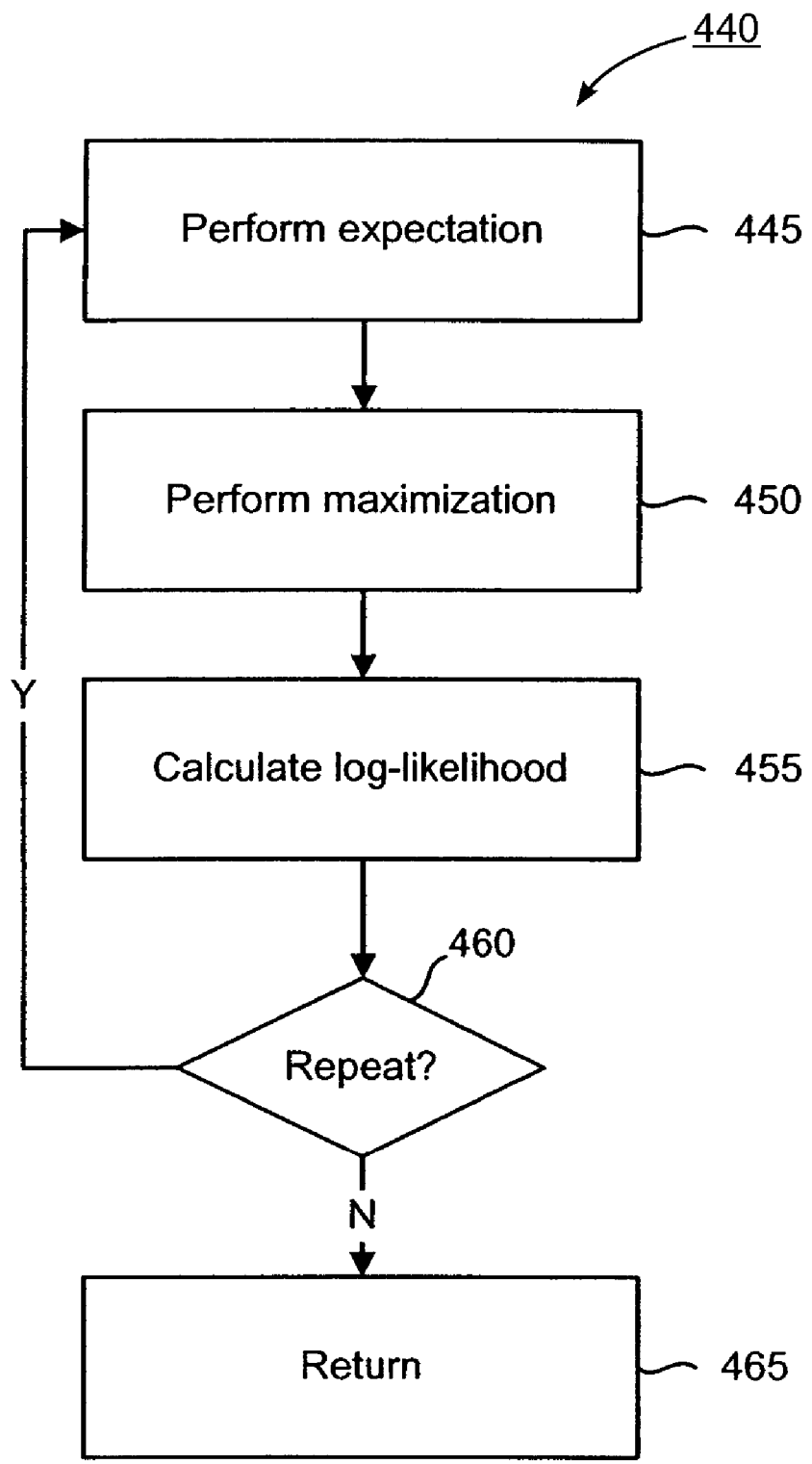
FIG. 10 is a flow chart describing an expectation maximization process for determining user profile attributes.

FIG. 10 provides a flow chart 440 describing an EM process. In one embodiment, the process of FIG. 10 is called by steps 410 and 420 of FIG. 11. In another embodiment, the process of FIG. 10 is called by step 500 of FIG. 12. In step 445, an expectation step is performed. In one embodiment, expectation step 445 determines P(g|s,u) as follows:

$$P(g|s, u) = \frac{P(s|g)P(g|u)}{\sum_{g'} P(s|g')P(g'|u)}$$

The parameters P(s|g) and P(g|u) used in a first iteration of step 445 can be initialized by an initialization step performed prior to the execution of FIG. 10.

In step 450, a maximization step is performed. In one embodiment, maximization step 450 determines values for P(s|g) and P(g|u) as follows:

$$P(s|g) = \frac{\sum_u n(s, u) P(g|s, u)}{\sum_{s'} \sum_u n(s', u) P(g|s', u)} \text{ and } P(g|u) = \frac{\sum_u n(s, u) P(g|s, u)}{\sum_{s'} \sum_{g'} n(s', u) P(g'|s', u)}$$

In one embodiment, the parameter P(g|s,u) used in maximization step 450 is provided by the result of estimation step 445. The parameter n(s,u) of maximization step 450 indicates the number of times user u has accessed web site s. In step 455, a log-likelihood is calculated. In one embodiment, the log-likelihood is determined as follows:

$$L = \sum_g \sum_u n(s, u) \log P(s, u)$$

In another embodiment, in step 455, the accuracy on a separate validation set of data is calculated using "folding in" to determine an accuracy value.

In step 460, the process of FIG. 10 determines whether to repeat steps 445, 450, and 455. If the steps are repeated, then the values of P(s|g) and P(g|u) calculated during the most recent maximization step 450 are substituted as the values of P(s|g) and P(g|u) in the next expectation step 445. Similarly, the value of P(g|s,u) calculated during the next expectation step 445 will be used in the next maximization step 450. As a result of these substitutions, the values of parameters calculated by the EM process of FIG. 10 can become increasingly accurate as multiple iterations of steps 445 and 450 are performed. In one embodiment, steps 445, 450, and 455 are repeated if the log-likelihood determined in step 455 has not decreased more than a threshold amount since a previous iteration of step 455. In another embodiment, steps 445, 450, and 455 are repeated if the accuracy value determined in step 455 has not decreased more than a threshold amount since a previous iteration of step 455. In another embodiment, the steps will be repeated until a fixed number of iterations has been performed, such as 100 iterations. If the steps are not repeated (step 465), then the process proceeds to step 465 where it returns.

Figure 11:
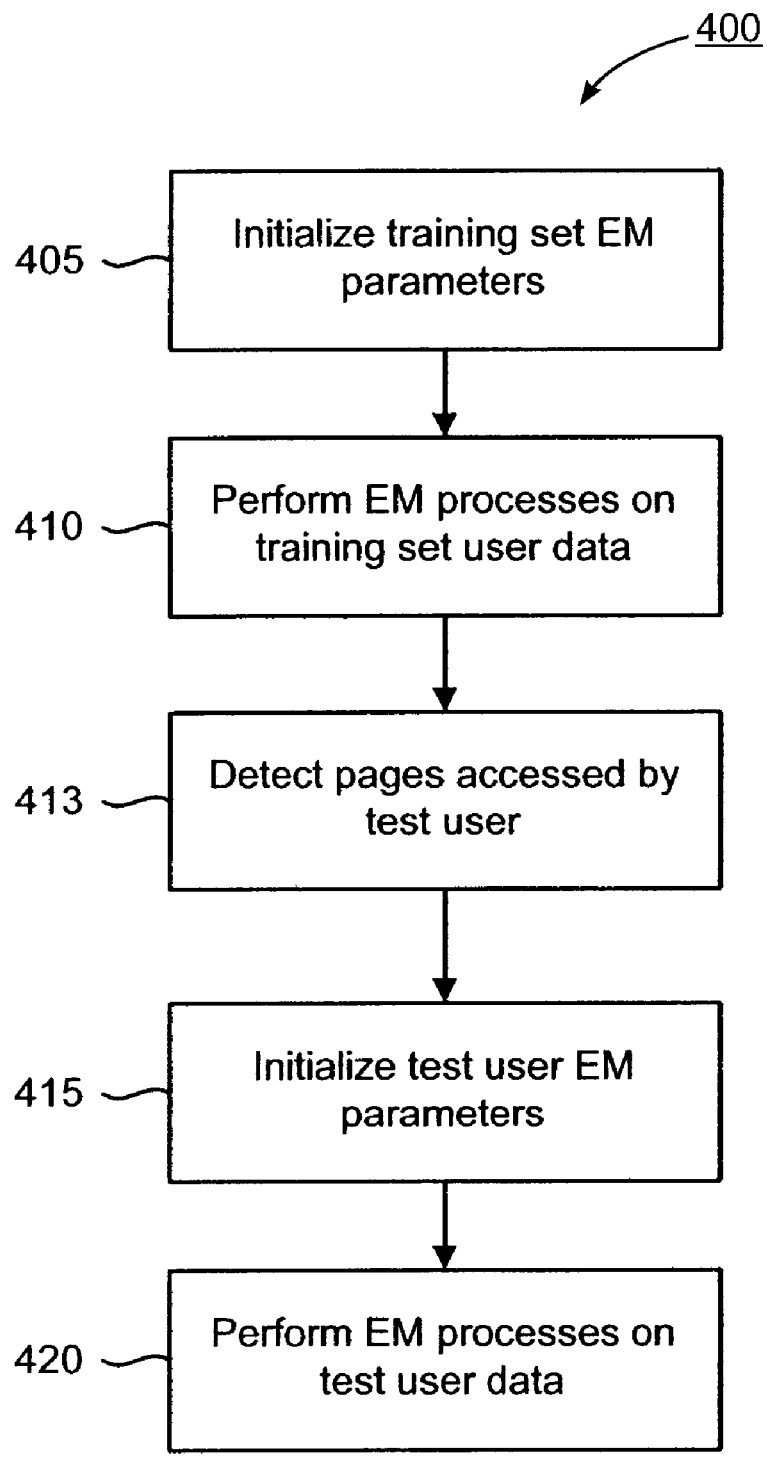
FIG. 11 is a flow chart describing an incremental classifier process for determining user profile attributes.

FIG. 11 provides a flowchart 400 describing an incremental classifier process employing "folding in" for determining user profile attributes. See Hofmann, Thomas, "Probabilistic Latent Semantic Indexing," Proc. SIGIR '99, pp. 50-57, 1999, for background concerning "folding in", which is incorporated by reference herein. An EM process is run using data from a training set of users having a known user profile attribute. The training set data is used to initialize parameters utilized by the EM process. As a result of the EM process, a value for the conditional probability of a web page s given a user profile attribute g is determined: $P(s|g)$. A second EM process is run to "fold in" data for a test user in order to determine a conditional probability of the classes of the user profile attribute sought to be determined, given the test user: $P(g|u)$.

In step 405, parameters for expectation and maximization steps are initialized for all sets of $(g,s,u)$ in a training set of users for whom a user profile attribute g and accessed web pages s are known. In one embodiment, $P(s|g)$ is initialized to a value equal to: 1/(number of web pages considered by the classifier). In another embodiment, $P(g|u)$ is initialized to a value of $\epsilon$ or $1-\epsilon$, where $\epsilon$ is close to 0. In one embodiment, $\epsilon$ is set equal to 0.00001. In step 410, separate EM processes are performed for each set of $(g,s,u)$ in the training set. As a result of step 410, the classifier is trained and $P(s|g)$ is determined for all sets of s and g in the training set. When the process of FIG. 10 is called by step 410 of FIG. 11, both parameters $P(s|g)$ and $P(g|u)$ are calculated. In step 413, web pages s accessed by a test user are detected. In step 415, new EM parameters are added to the model and initialized for all sets of $(g,s,u)$ where u in this case is a test user whose user attribute is sought to be determined. These initializations can be performed using the values of $P(s|g)$ calculated in step 410. In one embodiment, the parameter $P(g|u)$ is initialized to a value of 0.5. In step 420, separate EM processes are performed for each set of $(g,s,u)$ (where u is the test user in this case) using the newly initialized parameters from step 415, thus "folding in" the test user data. When the process of FIG. 10 is called by step 420 of FIG. 11, only parameter $P(g|u)$ for only the test user u is updated in the maximization step 450, and only $P(g|s, u)$ for u equal to the test user is updated in the expectation step 445. As a result of performing step 420, a value for $P(g|u)$ will be determined for the test user.

Figure 12:
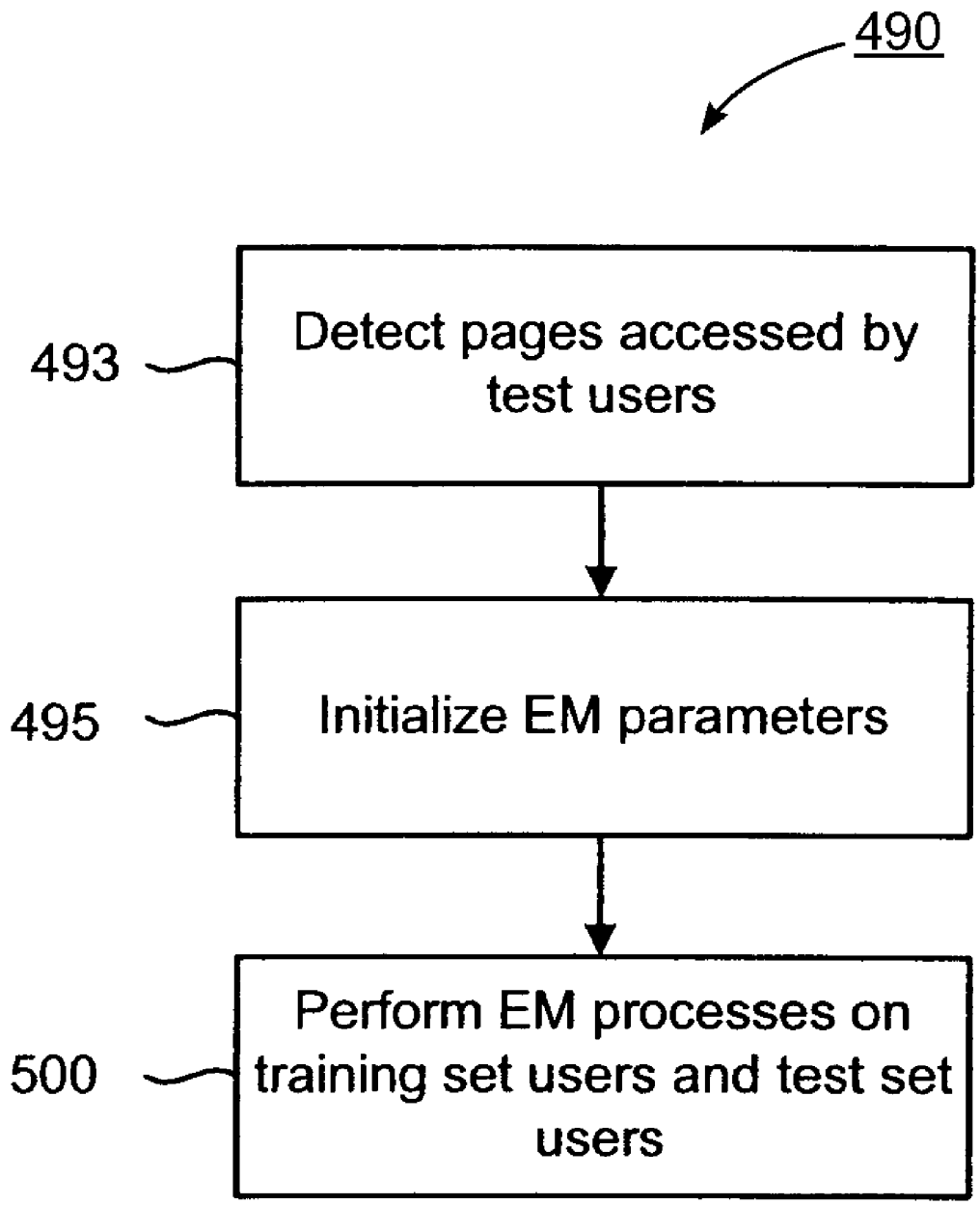
FIG. 12 is a flow chart describing a batch classifier process for determining user profile attributes.

In accordance with the present invention, a batch classifier approach can be used to determine user profile attributes for a set of test users that are combined with a training set of users for whom user profile attributes are known. FIG. 12 provides a flow chart 490 describing a batch classifier process. In step 493, web pages s accessed by one or more test users are detected. Similar to step 405 of FIG. 10, step 495 of FIG. 12 initializes EM parameters for separate EM processes to be run for all sets of $(g,s,u)$. For all users in the training set for whom gender is known, EM parameters are initialized as described above with respect to step 405. For test users for whom the sought user profile attribute is not known, these parameters are initialized as described above with respect to step 415. In step 500, separate EM processes are run on all sets of $(g,s,u)$.

As a result of step 500, a value for $P(g|u)$ is determined for all test users for whom the sought user profile attribute was not known.

In both the incremental and batch probability classifier processes above, a value for $P(g|u)$ is determined for each user. In one embodiment, the user profile attribute for which this parameter is greatest is predicted to be the user profile attribute of the user.

To evaluate the incremental and batch probability classifier processes above, users of a major Internet portal web site were analyzed. Table 1 below illustrates the classification results achieved by an incremental classifier process in accordance with the present invention. The incremental classifier was trained on a set of 615115 users with balanced male/female proportions, and then data for an independent balanced set of 153495 users was folded in to be classified.

TABLE 1

|        | % Correct | % Incorrect | % Unknown | Total  |
|--------|-----------|-------------|-----------|--------|
| Male   | 38        | 62          | 0         | 76748  |
| Female | 83        | 17          | 0         | 76747  |
| Total  | 60        | 40          | 0         | 153495 |

Table 2 below illustrates the classification results achieved by a batch classifier process in accordance with the present invention. The batch classifier was initialized based on the labels for a balanced set of 615115 users and then initialized uniformly for the separate balanced set of 153495 users considered by the incremental classifier process above. From Tables 1 and 2, it is apparent that the incremental and batch classifiers can achieve similar performance when using the same data set.

TABLE 2

|        | % Correct | % Incorrect | % Unknown | Total  |
|--------|-----------|-------------|-----------|--------|
| Male   | 36        | 64          | 0         | 76748  |
| Female | 84        | 16          | 0         | 76747  |
| Total  | 60        | 40          | 0         | 153495 |

In a second experiment using the incremental classifier, the classifier was trained on approximately 900,000 users for whom gender was known. Males comprised 66% of the training set data. The classifier performance was evaluated for all users which had visited at least N pages (a "step"), where N ranged from 1 to 200. For example, for N equal to 1, the first page visited by each user was input to the classifier.

Figure 13:
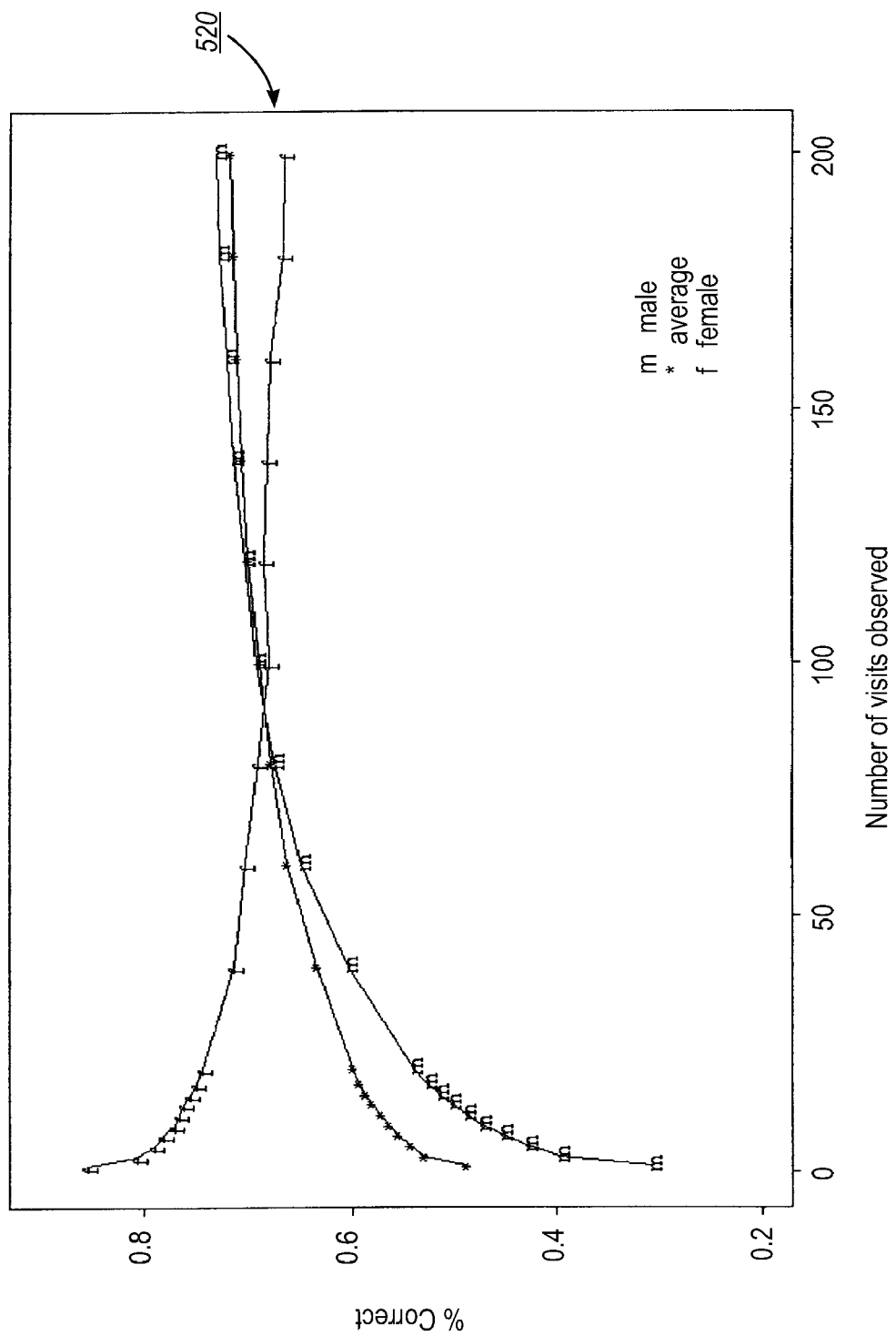
FIG. 13 is a plot illustrating accuracy rates achieved by an embodiment of the present invention using a probabilistic latent variable analysis with a single classifier.

FIG. 13 provides a plot 520 illustrating accuracy rates as a function of the number of pages visited. The male performance is labeled "m," the female performance is labeled "f," and the overall performance is labeled "*." As indicated by plot 520, males are classified with a higher accuracy than females as the number of accessed pages increases. When only a small number of pages have been visited by a user, then unless the user visits one of the traditional male pages, the chances are greater that a user will visit a random page that is predominately female. This bias of a "random" page being predominantly visited by females is observed in plot 520 in that where few pages have been visited, the female accuracy rate is higher.

Figure 14:
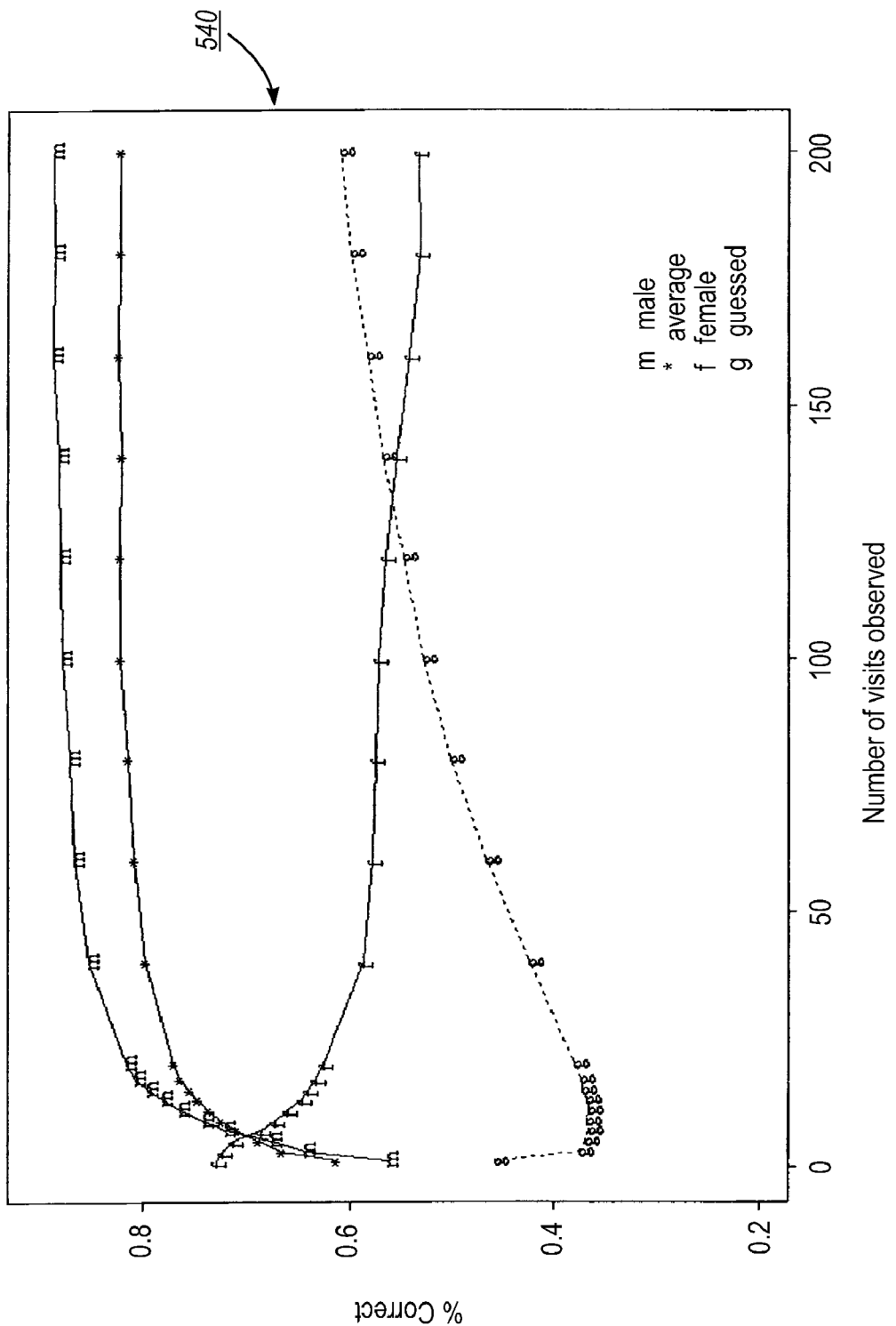
FIG. 14 is a plot illustrating accuracy rates achieved by an embodiment of the present invention using a probabilistic latent variable analysis with a minimum threshold.

In a third experiment using the incremental classifier, a threshold was set. In this experiment, $P(g|u)$ must be equal or greater than the threshold in order for the classifier to predict the gender of a test user. Although the threshold can be made dependent on the user attribute class (such as a threshold of 0.99 for female probabilities and a threshold of 0.5 for male probabilities, or vice versa), a single threshold of 0.99 was used for both gender classes in this experiment. FIG. 14 provides a plot 540 illustrating accuracy rates for achieved using this single threshold. In addition to the labels used in FIG. 13, the overall percentage of users for which a classification decision is made is labeled "g" in FIG. 14. As indicated by plot 540, except for the case of one page access, as more pages are accessed, the number of users for which a classification decision is made (the score is above threshold) increases. At a threshold of 0.99, when one page has been visited, 45% of all users are predicted with an overall accuracy of 61%, with an accuracy of 56% and 73% for males and females, respectively. When 200 pages have been visited, then 60% of all users are predicted with an overall accuracy of 82%, and an accuracy of 88% for males and 53% for females, respectively.

Figure 15:
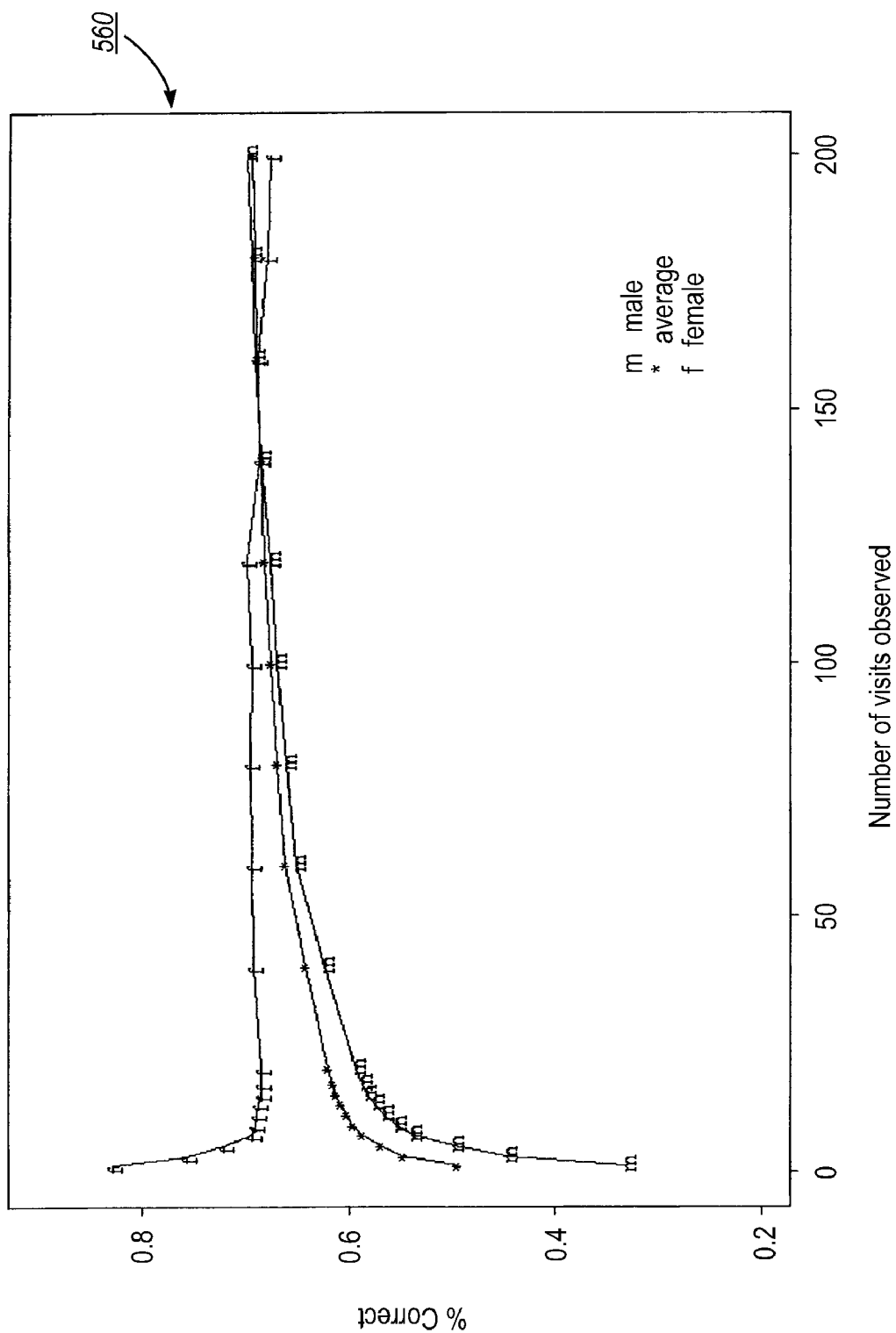
FIG. 15 is a plot illustrating accuracy rates achieved by an embodiment of the present invention using a probabilistic latent variable analysis with stepped classifiers.
Figure 16:
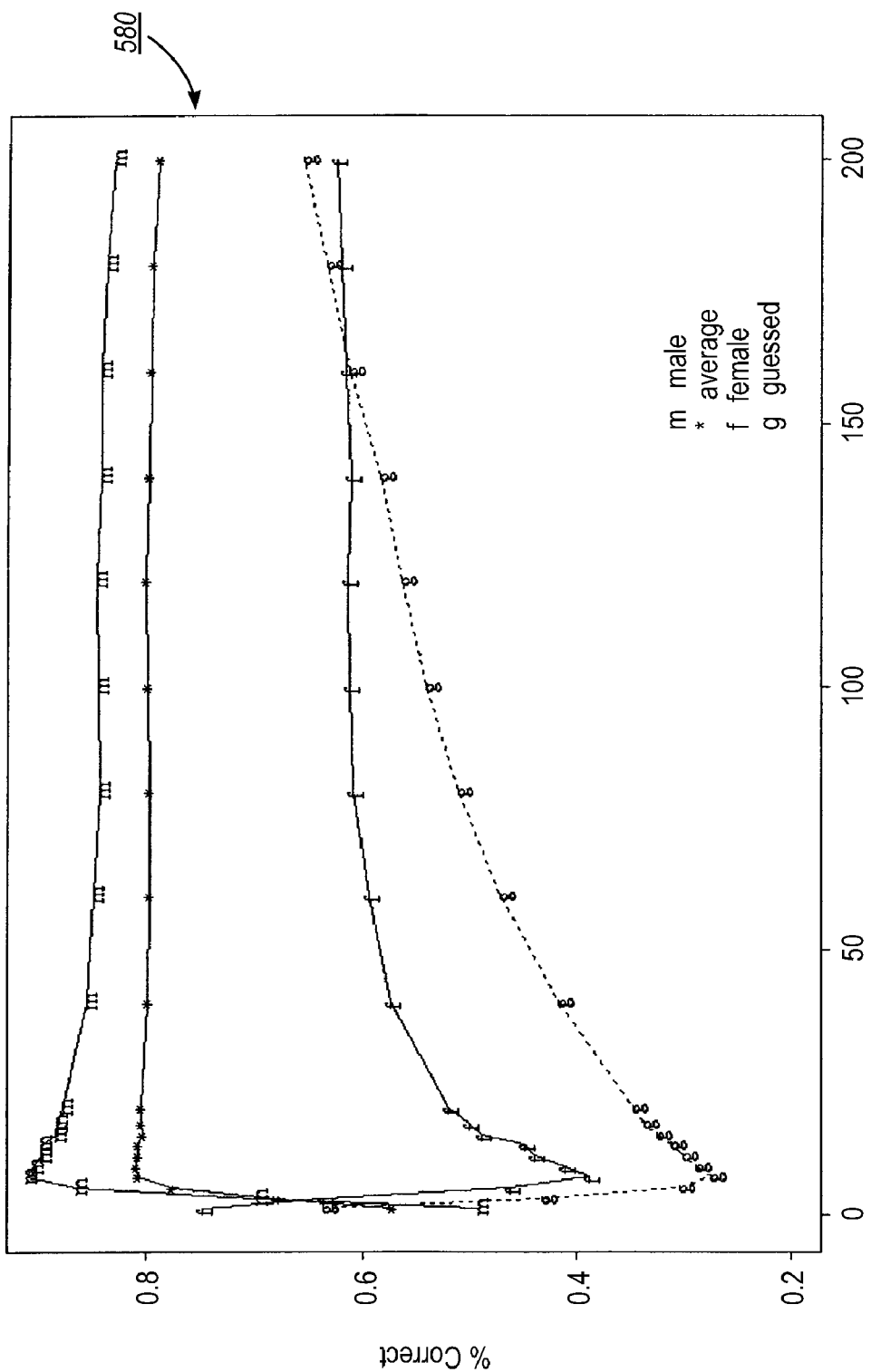
FIG. 16 is a plot illustrating accuracy rates achieved by an embodiment of the present invention using a probabilistic latent variable analysis with a minimum threshold and stepped classifiers.

In a fourth experiment, a separate incremented classifier was trained for each set of page visits. For example, for a set of N pages in the range 1 to 200, a classifier was created using the first N pages visited by each user in the training set that had visited at least N pages. FIG. 15 provides a plot 560 illustrating accuracy rates achieved by multiple stepped classifiers when analyzing test data. It will be appreciated that the average performance of the multiple stepped classifier approach illustrated in FIG. 15 is better than the performance of the single classifier approach illustrated in FIG. 13 when the number of web page visits is small. FIG. 16 provides a plot 580 illustrating accuracy rates achieved when a threshold of 0.99 was used by the multiple stepped classifiers. In FIG. 16, when 7 pages have been visited, an accuracy of approximately 80% is obtained when 27% of the users are classified. As indicated in FIG. 16, the accuracy remains approximately the same and a greater percentage of users are classified as the number of accessed pages increases. Thus, of the experiments above, the use of multiple classifiers utilizing a threshold achieved the highest accuracy rates given the experimental data.

In another embodiment of the present invention, stepped classifiers are utilized in the analysis of users who have visited only a few pages, while a combined classifier is used when a larger number of pages are visited (i.e. 20 pages). Subsampling of the page visits, such as creating classifiers only for the cases when 1, 3, 5, 7, 13, and 15 pages have been visited can be used to further reduce the number of classifiers needed with this method. A user that visits 6 pages, for example, can be classified using only the first 5 pages visited. The amount of memory required by a probabilistic classifier in accordance with the present invention can be further reduced by selecting a subset of pages to use.

To improve the accuracy of the probabilistic classifier discussed above, tempering can be used to prevent overfitting of data. In one embodiment, expectation step 445 is calculated as follows:

$$P(g|s, u) = \frac{[P(s|g)P(g|u)]^B}{\sum_{g'} [P(s|g')P(g'|u)]^B}$$

where B is initialized to a value of 1 and can be reduced as desired to improve accuracy. See Hofmann, Thomas, "Probabilistic Latent Semantic Indexing," Proc. SIGIR '99, pp. 50-57, 1999.

In another refinement, multi-class profiling can be performed for user profile attributes having several classes. Examples of such multi-class attributes include: age brackets, professions, and household income levels. The number of latent variables g can be set to the number of classes. In one embodiment, the parameter P(g|u) is initialized to a value of 1−ϵ in initialization steps 405, 415, and 495, where ϵ is a number much less than 1.0. In another embodiment, a threshold can be set on the parameter P(g|u) such that a user profile determination is not performed unless the value of P(g|u) is greater than the threshold.

In another embodiment, the number of subsets considered by the probabilistic classifier can be reduced. This can reduce the amount of memory required by the classifier. For example, the average mutual information MI(g,u) between a gender user profile attribute and users for each web page considered by the classifier can be determined as follows:

$$MI(g, u) = \sum_g \sum_u P(g, s, u) \log \frac{P(g|s, u)}{P(g)}$$

For each gender, the N users with the largest MI values are selected, where N is an integer greater than 1.

To enhance the accuracy of the vector, web page bias, and probabilistic classifiers described above, the results of all or subsets of the classifiers can be combined in a variety of ways. For example, the results of the classifiers can be combined in a linear combination. The results can also be combined in a weighted linear fashion by multiplying each result by a factor and summing the products. Similarly, the results of each classifier can be multiplied together with coefficients, as desired. In addition, results from different classifiers can be obtained depending on the total number of web pages visited by a test user. For example, if the total number of pages falls within a first range of numbers, a first classifier can be used to predict a user profile attribute. If the total number of pages falls within a second range, a different classifier can be used as an alternative, or in addition to the first classifier.

The foregoing detailed description of the invention has been presented for purposes of illustration and description. It is not intended to be exhaustive or to limit the invention to the precise form disclosed. Many modifications and variations are possible in light of the above teaching. For example, although present invention is described herein in relation to user access of Internet web pages, it will be understood that the present invention is similarly applicable to computing environments other than the Internet, as well as to the accessing of data other than web pages. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A machine-implemented method for extrapolating user profile information from user web page access patterns, the method comprising:
    computing bias values for a plurality of web pages;
    assigning said bias values to the plurality of web pages;
    detecting at least a subset of said web pages accessed by a user having an unknown user profile attribute;
    combining said bias values of said subset of web pages to obtain a combination result; and
    assigning a selected user profile attribute to said user in response to said combination result indicating a positive bias of the selected user profile attribute;
    wherein a respective bias value for a respective web page is determined based on the difference between a number of users with the selected user profile attribute who visit the respective web page and the product of a total number of users who visit the respective web page and a fraction of users with the selected user profile attribute as measured over the plurality of web pages that include the respective web page;
wherein said combination result is a summation of said bias values of said subset of web pages; and
wherein the unknown user profile attribute is predicted based on the positive bias of the selected user profile attribute.

2. The method of claim 1, wherein said unknown user profile attribute is demographic information.

3. The method of claim 2, wherein said demographic information comprises at least one of user gender and user age.

4. An apparatus, comprising:
a memory, said memory adapted to store program code;
a processor in communication with said memory, said program code capable of programming said processor to perform a method for extrapolating user profile information from user web page access patterns, the method comprising:
computing bias values for a plurality of web pages;
assigning said bias values to the plurality of web pages;
detecting at least a subset of said web pages accessed by a user having an unknown user profile attribute;
combining said bias values of said subset of web pages to obtain a combination result; and
assigning a selected user profile attribute to said user in response to said combination result indicating a positive bias of the selected user profile attribute;
wherein a respective bias value for a respective web page is determined based on the difference between a number of users with the selected user profile attribute who visit the respective web page and the product of a total number of users who visit the respective web page and a fraction of users with the selected user profile attribute as measured over the plurality of web pages that include the respective web page;
wherein said combination result is a summation of said bias values of said subset of web pages; and
wherein the unknown user profile attribute is predicted based on the positive bias of the selected user profile attribute.

5. The apparatus of claim 4, wherein said unknown user profile attribute is demographic information.

6. The apparatus of claim 5, wherein said demographic information comprises at least one of user gender and user age.

7. A non-transitory processor readable storage medium, comprising:
processor readable program code embodied on said processor readable storage medium, said processor readable program code for programming a processor to perform a method for extrapolating user profile information from user web page access patterns, the method comprising:
computing bias values for a plurality of web pages; assigning said bias values to the plurality of web pages;
detecting at least a subset of said web pages accessed by a user having an unknown user profile attribute;
combining said bias values of said subset of web pages to obtain a combination result; and
assigning a selected user profile attribute to said user in response to said combination result indicating a positive bias of the selected user profile attribute;
wherein a respective bias value for a respective web page is determined based on the difference between a number of users with the selected user profile attribute who visit the respective web page and the product of a total number of users who visit the respective web page and a fraction of users with the selected user profile attribute as measured over the plurality of web pages that include the respective web page;
wherein said combination result is a summation of said bias values of said subset of web pages; and
wherein the unknown user profile attribute is predicted based on the positive bias of the selected user profile attribute.

8. The processor readable storage medium of claim 7, wherein said unknown user profile attribute is demographic information.

9. The processor readable storage medium of claim 8, wherein said demographic information comprises at least one of user gender and user age.

10. A machine-implemented method for extrapolating profile information from web page access patterns of a user having an unknown user profile attribute, the method comprising:
detecting a set of web pages accessed by the user;
counting web pages in said set of web pages to obtain a total number of web pages;
performing a first classification method to obtain a first classification result if said total is within a first range;
performing a second classification method to obtain a second classification result if said total is within a second range; and
assigning a selected user profile attribute to said user in response to at least one of said results;
wherein one of said first and second classification methods is a bias method comprising:
computing bias values for a plurality of web pages that include the set of web pages accessed by the user, wherein a respective bias value for a respective web page is determined based on the difference between a number of users with the selected user profile attribute who visit the respective web page and the product of a total number of users who visit the respective web page and a fraction of users with the selected user profile attribute as measured over the plurality of web pages that include the respective web page;
assigning said bias values to the plurality of web pages; and
combining said bias values of said set of web pages to obtain a combination result;
wherein said assigning assigns the selected user profile attribute to said user in response to said combination result indicating a positive bias of the selected user profile attribute;
wherein said combination result is a summation of said bias values of said subset of web pages; and
wherein the unknown user profile attribute is predicted based on the positive bias of the selected user profile attribute.

11. The method of claim 10, wherein the other of the first and second classification methods is selected from the group consisting of vector and probabilistic classification methods.

12. The method of claim 11, wherein said unknown user profile attribute is demographic information that comprises at least one of user gender and user age.

* * * * *